(12) United States Patent
Bowden et al.

(10) Patent No.: US 12,263,974 B2
(45) Date of Patent: Apr. 1, 2025

(54) SYSTEM, METHOD AND APPARATUS FOR SEALING AND APPLYING MODIFIED ATMOSPHERE FOR BULK PERISHABLE BINS

(71) Applicant: RLMB Group, LLC, Honolulu, HI (US)

(72) Inventors: Randall Craig Bowden, Honolulu, HI (US); Robert W. Herdeman, Loveland, OH (US)

(73) Assignee: RLMB GROUP, LLC, Honolulu, HI (US)

( * ) Notice: Subject to any disclaimer, the term of this patent is extended or adjusted under 35 U.S.C. 154(b) by 0 days.

(21) Appl. No.: 17/827,465

(22) Filed: May 27, 2022

(65) Prior Publication Data

US 2022/0380075 A1   Dec. 1, 2022

Related U.S. Application Data

(60) Provisional application No. 63/194,691, filed on May 28, 2021.

(51) Int. Cl.
*B65B 31/04*   (2006.01)
*B65B 31/06*   (2006.01)
(Continued)

(52) U.S. Cl.
CPC .............. *B65B 31/06* (2013.01); *B65B 31/08* (2013.01); *B65B 51/10* (2013.01)

(58) Field of Classification Search
CPC ....... B65B 31/06; B65B 31/08; B65B 31/042; B65B 51/10; B65B 51/146; B65B 51/18; B65B 43/52; B65B 63/08; B65B 2220/18
See application file for complete search history.

(56) References Cited

U.S. PATENT DOCUMENTS 3,855,756 A   12/1974  Sweeney et al.
4,515,266 A *  5/1985  Myers ................ B65D 81/2092
                                         206/521.1
(Continued)

FOREIGN PATENT DOCUMENTS

FR    2 552 731 A1    4/1985
WO    2015/130992 A1  9/2015
(Continued)

OTHER PUBLICATIONS

International Search Report and Written Opinion dated May 4, 2021, directed to International Application No. PCT/US2020/067731; 21 pages.

(Continued)

*Primary Examiner* — Andrew M Tecco
(74) *Attorney, Agent, or Firm* — Michele V. Frank; Venable LLP

(57) ABSTRACT

Systems, methods, and apparatuses for treating and sealing perishable products in bulk bins and large bulk open top packaging are included. A modified atmosphere of industrial gas (i.e., nitrogen) and product specific treatments are injected within the contents of the liner bag or bin enclosure at the conclusion of the cooling cycle, in conjunction with or just after as the liner bag or open top bin enclosure is sealed. The methods and apparatuses provide alternative processes that can be applied manually or automated to seal of the bin liner bag or bin enclosure and then independently or in conjunction with cooling provide for the controlled and contained injection of modified atmosphere industrial gas treatments (i.e., nitrogen), sanitizer, and/or other functional substances to protect, preserve, or enhance the quality of the perishable product.

35 Claims, 25 Drawing Sheets

(51) Int. Cl.
    *B65B 31/08*     (2006.01)
    *B65B 51/10*     (2006.01)

(56) References Cited

U.S. PATENT DOCUMENTS

| | | | | |
|---|---|---|---|---|
| 4,912,913 | A * | 4/1990 | Rundle | B65B 51/065 |
| | | | | 156/468 |
| 5,226,735 | A | 7/1993 | Beliveau | |
| 5,251,753 | A | 10/1993 | Pigott et al. | |
| 5,314,286 | A | 5/1994 | Bolejack et al. | |
| 5,354,569 | A * | 10/1994 | Brown | B65B 25/041 |
| | | | | 426/316 |
| 5,402,906 | A * | 4/1995 | Brown | B65D 81/20 |
| | | | | 426/106 |
| 5,505,950 | A * | 4/1996 | Floyd | A23L 3/0155 |
| | | | | 426/396 |
| 5,735,786 | A * | 4/1998 | Krueger | B65D 5/606 |
| | | | | 493/101 |
| 5,747,082 | A * | 5/1998 | Floyd | A23B 7/0433 |
| | | | | 426/118 |
| 5,893,216 | A | 4/1999 | Smith et al. | |
| 5,896,995 | A | 4/1999 | Murray et al. | |
| 5,916,615 | A * | 6/1999 | Brady | B65D 81/24 |
| | | | | 229/123.1 |
| 5,945,147 | A | 8/1999 | Borchard | |
| 6,132,350 | A * | 10/2000 | Krueger | B65D 5/606 |
| | | | | 493/101 |
| 6,305,148 | B1 | 10/2001 | Bowden et al. | |
| 6,854,246 | B2 * | 2/2005 | Savage | B65D 77/06 |
| | | | | 53/472 |
| 6,920,740 | B2 * | 7/2005 | Blake | B65B 51/043 |
| | | | | 53/481 |
| 7,958,696 | B2 * | 6/2011 | McLaughlin | B65D 81/2023 |
| | | | | 53/436 |
| 8,256,190 | B2 | 9/2012 | Bowden et al. | |
| 8,337,752 | B2 * | 12/2012 | Yamamoto | B65B 55/18 |
| | | | | 422/26 |
| 8,507,020 | B2 | 8/2013 | DesLauriers et al. | |
| 8,662,334 | B2 * | 3/2014 | Turvey | B65D 81/2038 |
| | | | | 220/360 |
| 10,759,588 | B1 * | 9/2020 | Lobisser | B65D 19/02 |
| 11,110,645 | B2 | 9/2021 | Bowden | |
| 2005/0092637 | A1 | 5/2005 | Baechle et al. | |
| 2006/0048482 | A1 | 3/2006 | Borchard | |
| 2006/0147588 | A1 * | 7/2006 | Garwood | A23L 3/3418 |
| | | | | 426/392 |
| 2008/0134640 | A1 | 6/2008 | Bowden et al. | |
| 2008/0216450 | A1 | 9/2008 | MacLeod et al. | |
| 2012/0279180 | A1 | 11/2012 | Crawford et al. | |
| 2013/0205717 | A1 | 8/2013 | Bowden et al. | |
| 2014/0209607 | A1 * | 7/2014 | Fosse | B65D 17/462 |
| | | | | 220/270 |
| 2015/0203222 | A1 * | 7/2015 | Zonato | B65B 31/042 |
| | | | | 53/455 |
| 2018/0141738 | A1 * | 5/2018 | Armano | B65D 85/50 |
| 2019/0143580 | A1 | 5/2019 | Bowden | |
| 2022/0380075 | A1 | 12/2022 | Bowden | |
| 2023/0059420 | A1 | 2/2023 | Bowden et al. | |

FOREIGN PATENT DOCUMENTS

| | | |
|---|---|---|
| WO | 2021/138602 A1 | 7/2021 |
| WO | 2022/246205 A1 | 11/2022 |

OTHER PUBLICATIONS

International Search Report and Written Opinion dated Oct. 17, 2022, directed to International Application No. PCT/US2022/030263; 17 pages.

Arpac A Duravant Company, "ARPAC's ARBOT Robotic Palletizer and Automatic Stretch Wrapper Palletizing Magazines," (Jun. 16, 2014). retrieved at <https://www.youtube.com/watch?v=yeKbXxbNZnA> 0:00-5:48.

Office Action dated Aug. 23, 2023, directed to Canadian Patent Application No. 3,161,518; 4 pages.

Extended European Search Report dated Apr. 17, 2024, directed to EP Application No. 20908565.3; 5 pages.

Non-Final Rejection dated Aug. 1, 2024, directed to U.S. Appl. No. 17/790,098; 21 pages.

International Search Report and Written Opinion mailed Oct. 31, 2024, directed to International Application No. PCT/US2024/033598; 16 pages.

Notice of Allowance mailed Feb. 12, 2025, directed to U.S. Appl. No. 17/790,098; 10 pages.

\* cited by examiner

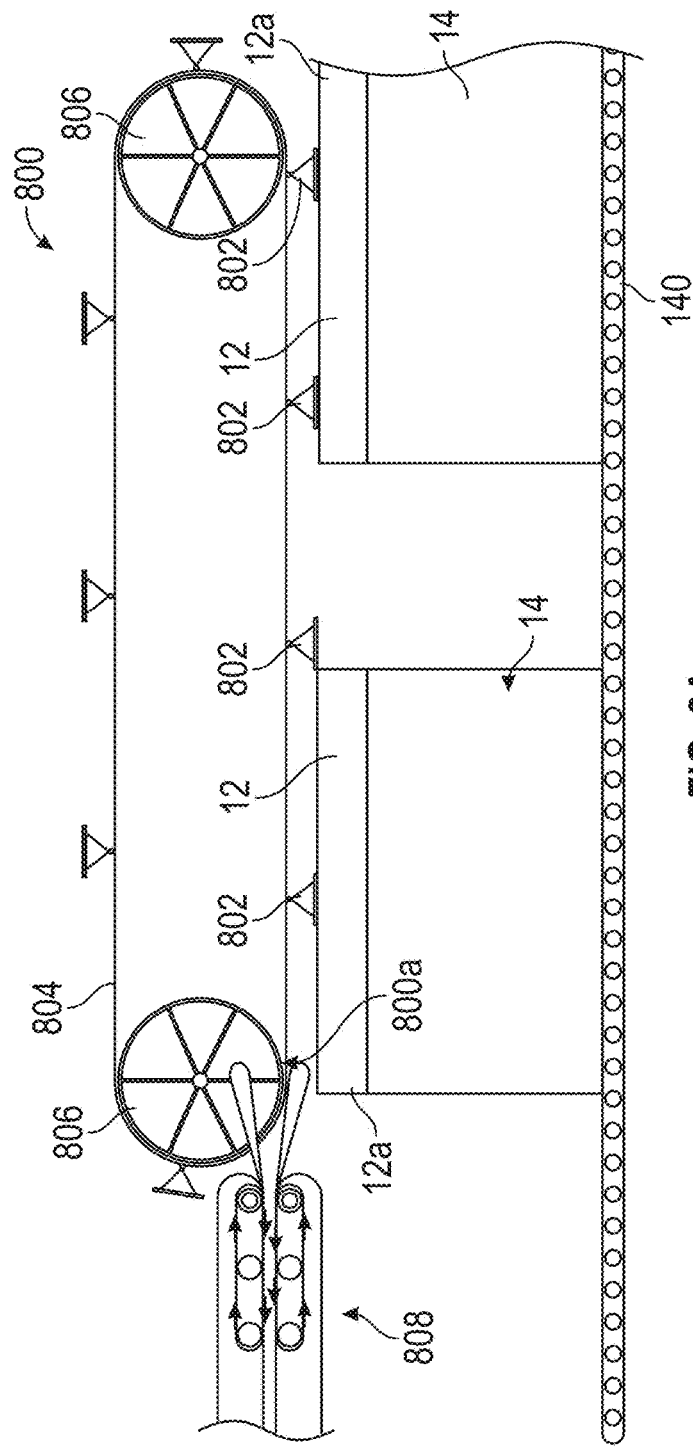
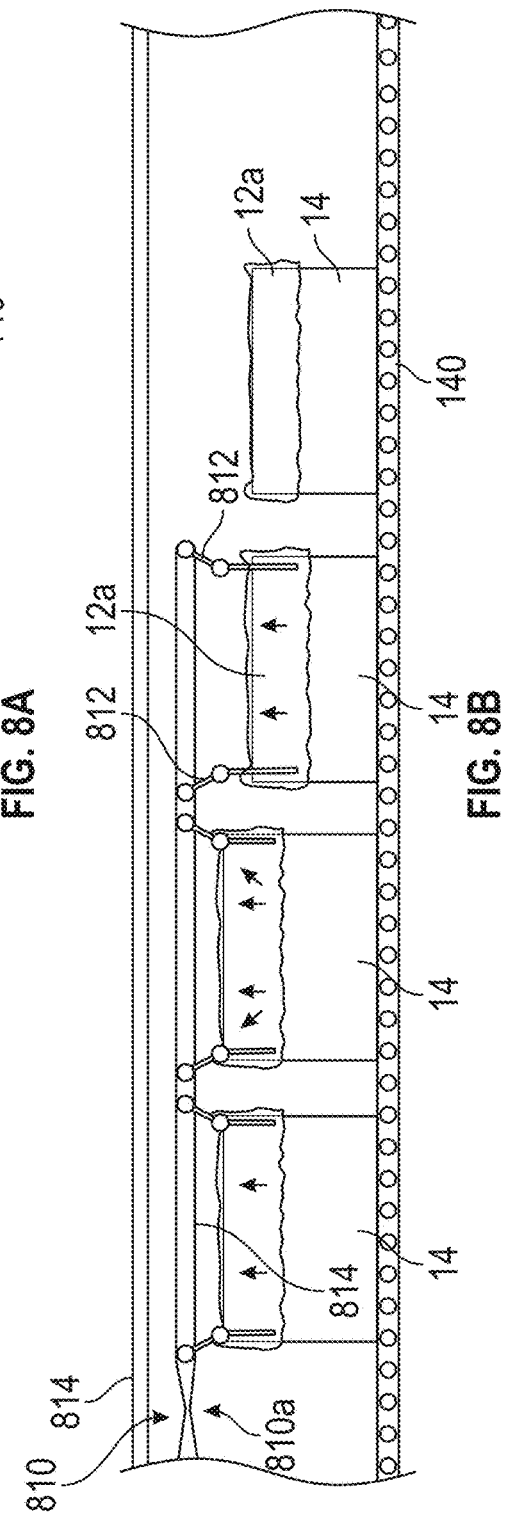
FIG. 8A
FIG. 8B

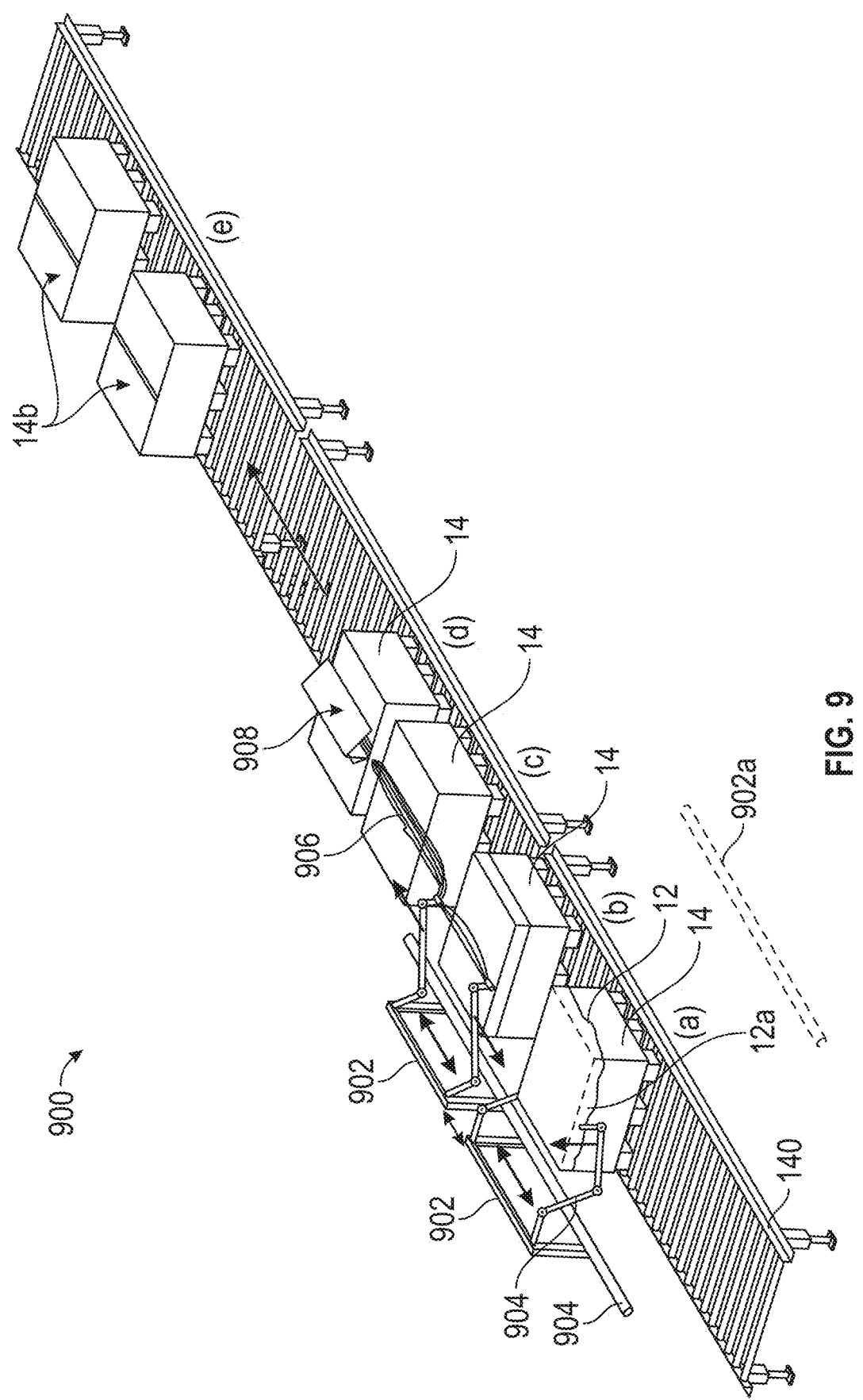

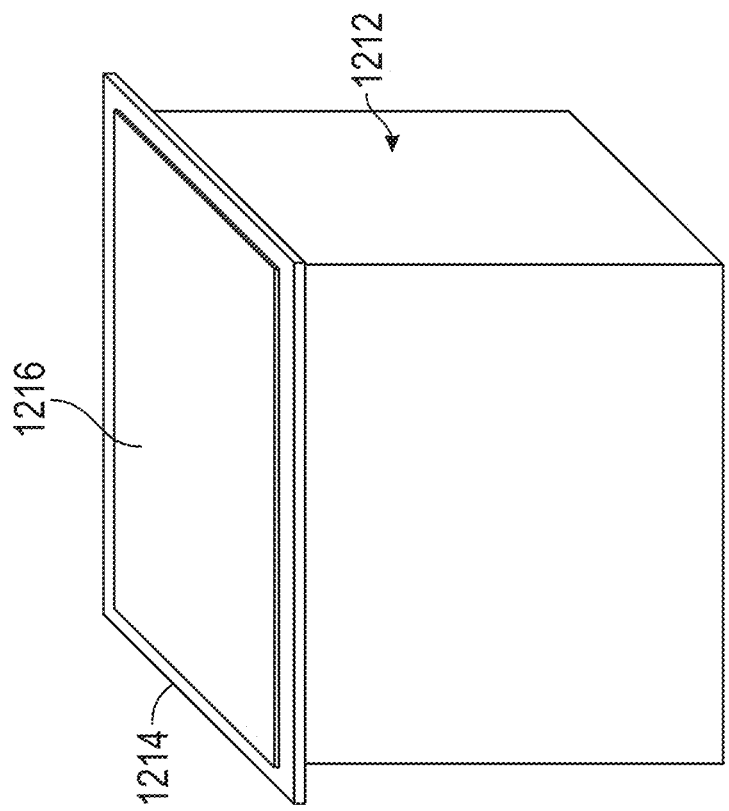
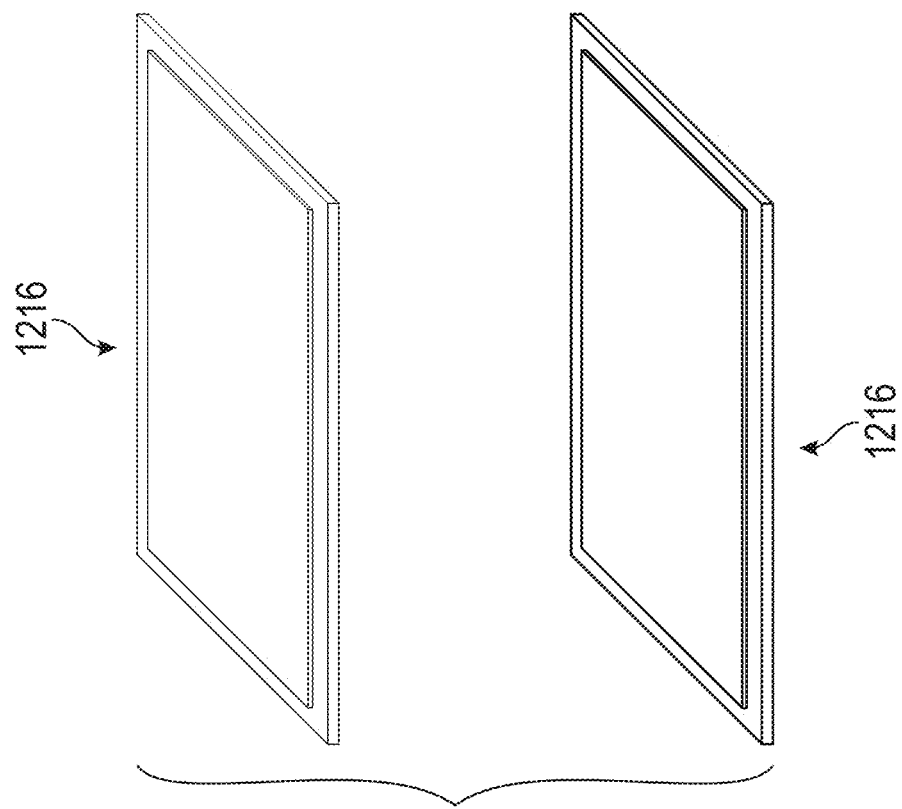
FIG. 12C

SYSTEM, METHOD AND APPARATUS FOR SEALING AND APPLYING MODIFIED ATMOSPHERE FOR BULK PERISHABLE BINS

CROSS REFERENCE TO RELATED APPLICATIONS

This application claims priority to U.S. Provisional Application No. 63/194,691, filed May 28, 2021, the entire contents of which are hereby incorporated by reference in its entirety. This application is related to International Patent Application No. PCT/US2020/067731 filed Dec. 31, 2020, which claims priority to U.S. Provisional Patent Application No. 62/955,969, filed Dec. 31, 2019, the contents of each of which are hereby incorporated herein by reference in their entirety. This application is related to International Patent Application No. PCT/US2022/030263 filed May 20, 2022, which claims priority to U.S. Provisional Application No. 63/191,720, filed May 21, 2021, the entire contents of each of which are hereby incorporated herein by reference in their entirety.

TECHNICAL FIELD

The present application relates to improved systems, methods, and apparatuses for treating and sealing perishable products in bulk perishable packaging, totes, and bulk bins. Improvements to process, protect and treat bulk packaged perishable products. Some important elements of the system describe the improved methods and apparatus for creating a sealed enclosure, establishing the target modified atmosphere, and injecting and containment of functional treatments. The systems and methods include use of flexible, collapsible, and/or nestable liners, inserts, sleeves, covers, lids, bins, caps, etc., which provide better capability, recyclability, transportability as a bulk package. Airtight enclosures are created that are structurally supported by a reusable/foldable package framework for various types of bulk, open top loaded packaging including bins, totes, master shipping boxes. In addition to the reuse/recyclability aspect, the system provides for either manual, mechanical or robotic means to accomplish the desired enclosure and treatments to protect, preserve, and/or enhance the perishable product during storage and transport.

BACKGROUND

Bulk bins are generally used for the packing and shipment of commodities such as, for example, perishable products, such as produce (e.g., iceberg lettuce, cabbage, carrots, & onions) that may be further processed (e.g., into precut products at regional food process facilities). The bulk bin includes a large container often with a plastic liner bag that fits within, and which holds the perishable product. The bulk bins may contain contents weighing around 800 lbs., although other sizes of bins may be employed. The bulk bins may be used for items such as pre-cored lettuce and cabbage. Other items include pre-peeled carrots and pre-peeled onions which have been cooled and processed/peeled at large commodity focused facilities near harvest, and must be preserved for further processing days later at regional processing centers. Due to the large scale of the supply chain, millions of bins of perishables are handled this way. Ideally, all handling after harvest would be without any manual touch, for example trimming defects or manually sealing the bins, and at high production rates and speeds.

One example of commercial bulk MAP bin use is for head lettuce and cabbage. The current practice is to trim and remove the core material of the head lettuce or cabbage at the time of harvest and the cut area may be field rinsed or washed. For the scale of production needed, the intention is that no further manual handling or trimming of the product will be needed until the product is processed in a machine that will chop or slice it for use in salads and such. The cut surfaces in the core area are a vulnerable location for decay, deterioration, and/or discoloration. In the event that visible deterioration occurs with the product, it would be required to go through a manual process to trim away defects. This significantly increases labor, time, costs, reduces yields, and reduces production rates. To prevent rapid deterioration or discoloration of the perishable product, the product must be cooled within hours of harvest and then be placed within a low oxygen modified atmosphere. This process generally intends that no deterioration or discoloration occur during the delivery to the final processing facility that may be several days distance from the harvest location.

The speed, efficiency, reliability, and cost of the process to cool, modify the atmosphere, and seal the bins following cooling is thus a critical component to this overall supply chain process. Delays or inadequate sealing can result in a bin of product that is not usable or does not meet the operational objectives of the processing facility. A typical current process takes about 2 hours from the time the bins are received at the cooling facility until they are transported to the cooler for onward distribution. After harvest, the bins are brought to a cooling and distribution facility where the bins of product are unloaded and staged for the process of cooling and sealing. Typically, the bins of product are separated to allow workers access to the bins, the liners are then prepped manually to be mostly closed with a long zip tie pre-attached to support an opening the shape of a ring. The small opening partially restricts the cooling process. When bins are double stacked for cooling, the bottom bin may be vulnerable to foreign material contamination. At the conclusion of the vacuum cooling process, nitrogen is added to the vacuum cooler as it returns to normal atmosphere. The nitrogen also fills the void volume within the bins, thus creating a low oxygen modified atmosphere. After cooling, the bins must be unloaded from the vacuum cooler and separated to again allow workers to perform the manual step to physically pull a zip tie to close the opening of a large bin liner. This current method for closing the bin liner bag may not create a leakproof seal, may be vulnerable to variation, delays, and less than intended results, and may have an associated labor cost increase. For example, if delays or a leaky seal, the nitrogen can escape, and air/oxygen can enter the bin liner creating an environment with a higher than target oxygen level. This situation would likely yield product with discoloration. The addition of functional substances, including sanitizers, along with the nitrogen may be possible for materials and levels that do not pose a risk to the environment, personnel safety or materials of construction. However, the properties of various substances and sanitizers require that they be added in a more controlled and uniform method directly to the bins themselves.

A further description of the process at the processing facility outlines the impact of the methods to seal the bin. The current bin with zip tie must be opened by cutting and removing the zip tie and then pulling the bin liner back around the top sides of the bin. The bin is inverted to dump the product into a hopper. Frequently, the product removal carries the bin liner into the hopper requiring labor to retrieve it. This presents some worker safety issues and can slow the process down. The zip tie must be retrieved as it poses a foreign material contamination risk. The zip tie and bin liner are then collected for disposal or recycle. The current bin dumping process may also carry the risk of wood pallet foreign material contamination risk.

Therefore, there is a need for an improved process that can seal a liner bag of the bulk bin or the bulk bin itself and protect the perishable product and atmosphere within the bin. In addition, treatments in addition to the modified atmosphere are needed to provide additional product protection from decay, deterioration and to reduce food safety concerns.

BRIEF SUMMARY OF THE INVENTION

According to an embodiment, a method for sealing one or more containers may include placing the one or more containers having a liner therein on a moving conveyor, moving the one or more containers with the conveyor, opening the liner, collecting the liner with clips, a grab and pinch device, robotic arms, robotic fingers, or combinations thereof, wherein the collecting occurs in tandem with the one or more bins moving along the conveyor, pulling together open edges of the liner, and sealing the liner together with a heated band sealer, a wide or double seal impulse sealer, a heat sealer, a sealer, or combinations thereof, wherein the sealing occurs in tandem with the one or more containers moving along the conveyor. The one or more containers contain perishable product.

According to an embodiment, the one or more containers is a bin or a large bulk product packaging container.

According to an embodiment, the liner is a bag liner.

According to an embodiment, the liner forms a sealed enclosure therein.

According to an embodiment, the one or more containers is cooled prior to sealing.

According to an embodiment, the method further includes cooling the one or more containers and infusing an interior of each of the one or more containers with nitrogen prior to sealing, and wherein a sanitizer and/or substance treatment is added to the interior of each of the one or more containers during or at the end of the cooling.

According to an embodiment, the cooling is vacuum cooling.

According to an embodiment, the method further includes piercing the liner with one or more nozzles, and adding vacuum, controlled venting, nitrogen (industrial gas or air), sanitizer, functional substances, or combinations thereof to an interior or the liner prior to removing the one or more nozzles from the liner, removing the one or more nozzles from the liner, and sealing a location where the one or more nozzles pierced the liner.

According to an embodiment, a method for sealing a perishable product in a bin includes placing the bin having a liner therein on a moving conveyor, moving the bin with the conveyor, opening the liner, collecting the liner with clips, a capture-grab and pinch device, robotic arms, robotic fingers, or combinations thereof, wherein the collecting occurs in tandem with the one or more bins moving along the conveyor, pulling together open edges of the liner and twisting and looping the edges of the liner together, and sealing the twisted and looped edges of the liner together with a taper, zip tie devise, heat seal, or combinations thereof, at the twisted and looped location.

According to an embodiment, a method for sealing a perishable product in a bin may include placing the bin having a liner therein on a moving conveyor, moving the bin with the conveyor, opening the liner, placing a top sheet over an open top of the liner and the bin and holding the top sheet in place, pushing along one or more edges of the top sheet with mechanical brushes or fingers, and sealing the top sheet to the bin and the liner using a taper device, wherein the taper device rotates around the bin or wherein the bin is on a turntable.

According to an embodiment, a method for sealing a perishable product in a bin may include molding a bin liner to form a molded bin liner, wherein the molded bin liner is a semi-rigid sleeve, placing the molded bin liner in the bin, wherein the bin is a weight supporting bin, and fitting a lid over the molded bin liner and the bin, wherein the lid clicks and seals to the molded bin liner.

According to an embodiment, the method further includes heat sealing the lid to the molded bin liner.

According to an embodiment, the method further includes cooling the bin.

According to an embodiment, the method further includes applying a top to the bin prior to the cooling, wherein the top includes perforations that are open prior to cooling, and closing the perforations after cooling and infusion of an interior of the bin with nitrogen, industrial gas, and/or a functional substance treatment.

According to an embodiment, the top is a top sheet, a vented lid cap, a lid cap, or a lid.

According to an embodiment, closing the perforations includes taping the perforations, moving a lid cover over the perforations to seal the perforations, sealing the perforations, replacing the top with a non-vented lid, or combinations thereof.

According to an embodiment, the top is applied to the bin prior to the cooling and wherein the top includes perforations or is a vented lid-cap that are open prior to cooling and are then tape sealed closed, a cover is applied only to the vented portion of the lid, or replaced with a non-vented lid which is sealed after cooling and infusion with nitrogen.

According to an embodiment, a method for sealing a perishable product may include providing a weight supporting bin containing the perishable product, sealing the weight supporting bin with a fitted lid, providing nitrogen and/or other gasses to the bin creating a modified atmosphere within the weight supporting bin after sealing the weight supporting bin, adding other functional substances along with the modified atmosphere into the sealed weight supporting bin, and resealing the weight support bin, in conjunction with or immediately after the modified atmosphere is created.

According to an embodiment, the method may include cooling the weight supporting bin.

According to an embodiment, the method may include applying a top sheet to the bin, wherein the fitted lid is applied to the weight supporting bin prior to the cooling and wherein the top sheet has perforations that are open prior to cooling and are then tape sealed closed after cooling and infusion with a substance treatment.

According to an embodiment, the method may include an apparatus for de-cuffing a plastic bin liner bag from bin and elevate the bin liner bag up vertically, straighten and stretch it taut.

According to an embodiment, the method may include an apparatus designed to capture the elevated bin liner bag and hold in place while the bin is moving along a conveyor between stages.

According to an embodiment, the method may include an apparatus de-cuffing, elevating, straightening and stretching or holding the liner bag may include one or more nozzle-fingers for vacuuming or adding industrial gas or applying substance treatments inside of the bin liner bag during conveyance, prior to, and/or in conjunction with the sealing.

According to an embodiment, the sealing further comprises an apparatus for band heat sealing or impulse heat sealing the liner to complete the seal.

According to an embodiment, the method may include an apparatus configured to apply a top sheet over the bin and a pulled open bin liner bag within the bin.

According to an embodiment, sealing further comprises an apparatus configured to tape and seal a top sheet to the bin and a bin liner bag creating a complete seal.

According to an embodiment, the method may include an apparatus to apply the fitted lid to the bin, wherein the bin is an airtight bin, and wherein the sealing includes tape sealing or heat sealing the fitted lid to the airtight bin.

According to an embodiment, the method may include cooling the weight supporting bin and, immediately after cooling the weight supporting bin, applying a modified atmosphere, treatment, and/or substance.

According to an embodiment, the method may include an apparatus with one or more nozzles capable to add vacuum-controlled venting, industrial gas, sanitizer, or other functional substances to the headspace and/or enclosed product and then reseal the bin liner.

According to an embodiment, the method may include inserting the one or more nozzles into the opening of the bin liner bag and injecting a vacuum, industrial gas, sanitizer, or other functional substances into the bin contents just prior to or in the process of resealing the liner.

According to an embodiment, the method may include providing one or more containment devices, pads, or sealing sleeves to prevent leakage during injecting or resealing.

According to an embodiment, the one or more nozzles are inserted into the opening of the bin liner bag and vacuum-controlled venting, industrial gas, sanitizer, or other functional substances are injected, sprayed, or inserted into the bin headspace, products, or contents just prior or in the process of sealing the liner-bin enclosure.

According to an embodiment, the method may include an apparatus to heat seal the fitted lid to a molded semi-rigid liner sleeve within the bin or the bin.

According to an embodiment, the method may include an apparatus which is a vented bin cover that covers the bin in a way to allow maximum rate of cooling within a vacuum cooling tube but also prevents foreign material from falling into the bin space.

According to an embodiment, a system for sealing a bin may include a movable conveyor for moving one or more bins, a protective racking system for stacking one or more bins into the movable shuttle or conveyor, and a vacuum cooling tube. The one or more bins have an open top or vented bin lid, the open top or vented bin lid configured to cool a product within the bin and protect the product from falling debris and cross contamination during vacuum cooling, gas flushing, substance treatments, further handling, the covering, closing, and/or sealing of the bins.

According to an embodiment, the system may include a sealer for sealing a liner within the bin.

Additional features, advantages, and embodiments of the present disclosure are set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 8A illustrates a system having a conveyor with a bin, according to an embodiment of the present disclosure.

FIG. 8B illustrates a system having a conveyor with a bin, according to an embodiment of the present disclosure.

FIG. 9 illustrates a system having a conveyor with a bin, according to an embodiment of the present disclosure.

FIG. 12C illustrates a perspective view of the molded, semi-rigid sleeve with a top of FIG. 12A, according to an embodiment of the present disclosure.

DETAILED DESCRIPTION OF THE INVENTION

Figure 1A:
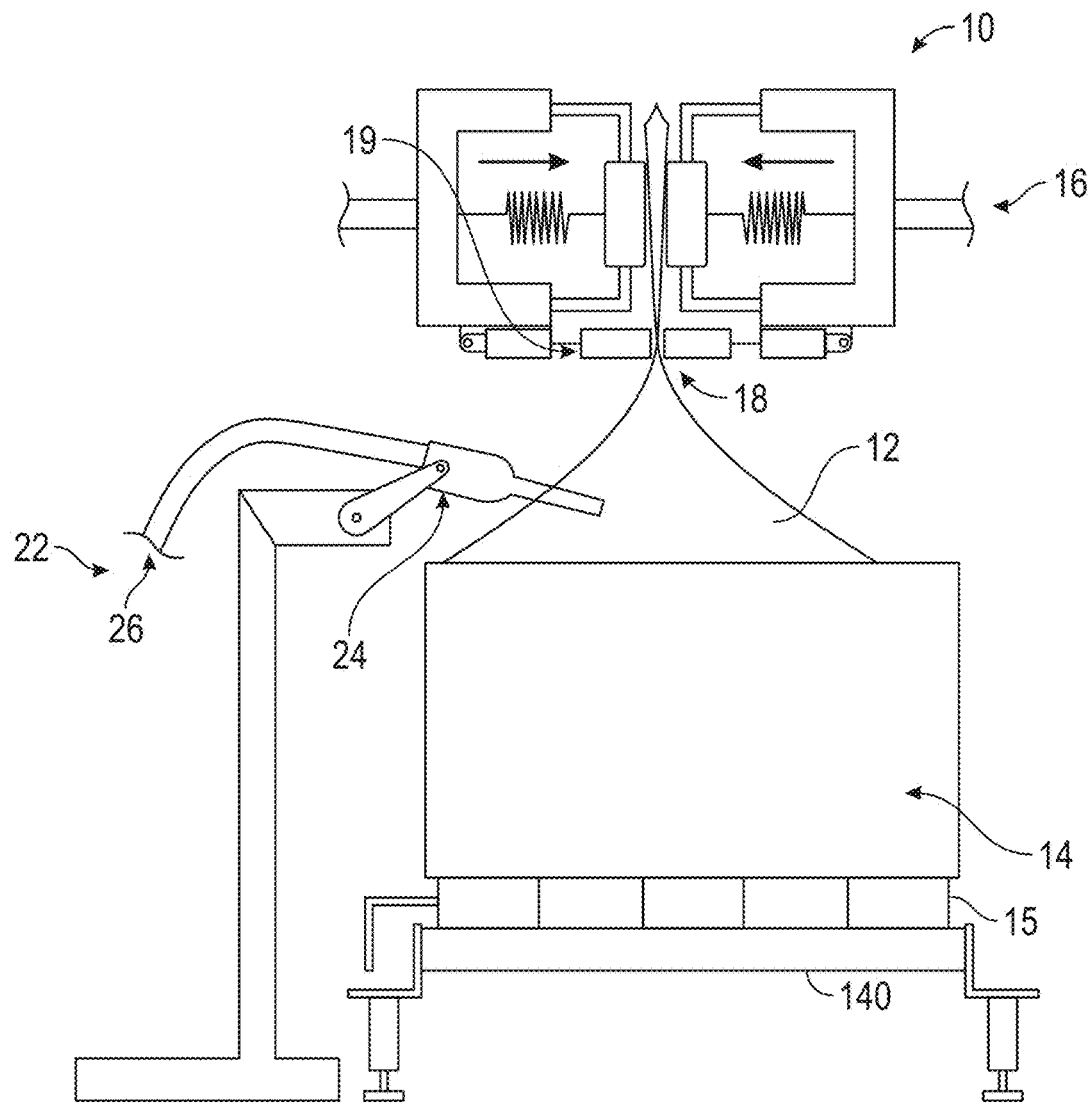
FIG. 1A illustrates a system with a twist, loop, and tape seal apparatus for a liner of a bin, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

Bulk bins, also referred to herein as bins, may include a liner within the bin. The liner may be a plastic liner. The liner may be filled with a product, such as, a perishable product and/or produce, though other products are contemplated. For example, the bin with the plastic liner may be filled during harvest with pre-trimmed and cored lettuce, cabbage, and/or other commodities. Excess bin liner material may extend from the bin (e.g., above an uppermost edge of the bin). The bin liner may be partially pulled to cover the product and a temporary lid or cover may be placed over the bin for transport to the precooling facility. There, the bins may be unloaded and separated so workers have sufficient workspace around the individual bins, the bins may then be prepared by manually pulling the bin liner partially closed and fitting a long zip tie cinch around the liner. The partially closing may be in a manner to maintain a minimum of more than 17% open space for effective vacuum cooling. The bins may then be gathered by a forklift individually and placed on a conveyor that moves them into the vacuum precooling system and are cooled to 32° F. to 34° F. At the conclusion of cooling, some processes replace the vacuum with nitrogen gas. As the vacuum cooling system opens and the bins are removed by a forklift, separated in a large work area to allow workers sufficient walking-work space, the zip ties are manually pulled to close and partially seal the bins. If done quickly by the labor, the bins retain most of the nitrogen that was infused in the vacuum cooling system.

The present disclosure provides alternative processes for the step leading into cooling and up to the final closure.

For example, the bins of harvested product may arrive from the field to the vacuum cooling facility with a protective lid, vented cap, or screen cover placed over the bin for transport to the cooling facility. There, the bins are unloaded and placed directly on a conveyor where any non-vented lid caps are removed (manually, robotically, mechanically, or combinations thereof) and vented lid-caps or screen covers remain. For double stacking, a special frame or racking design is added to the conveyor system. Bins may be placed on the movable racks. The rack may include a protective cover to prevent foreign material falling into the bottom bins. The bins then move into the vacuum precooling system and are cooled to 32° F. to 34° F. No zip tie may be provided around the liner bag within the bin. Without the restriction from the zip tie, this method allows the vacuum cooling process and $N_2$ addition to be accomplished faster, safer, and more efficient as compared to conventional methods and systems.

After vacuum cooling, the bins are set and then moved, for example, via a conveyor, along a closure process line. This may eliminate extra handling, separation and manual closure steps of the conventional methods and systems. At this point, during a first stage, any reusable vented lids may be removed for cleaning, return, and reuse to the harvest operation. Any bins with bag liners but without covers, caps, and/or lids may then proceed with de-cuffing the top portion of the bin liner from bin. Next, during a second stage, the bin liner may be captured or secured using a mechanical device. For example, the mechanical device may be clips, robotic fingers, etc., The mechanical device may grab, pull, straighten and/or hold the bin liner vertically above the bin. Subsequently, a third stage may include a band sealer to pull the liner material to a central connection, where the liner is heated or otherwise melted or adhered to create a seal in the liner bag, resulting in a sealed enclosure within the liner bag. In conjunction with, or subsequently, the bin bag is sealed, additional stages may insert nozzles to pull a vacuum, add a functional treatment, substance, modified atmosphere, nitrogen, a sanitizer (such as atomized ionized hydrogen peroxide or ozone gas), other functional substances beneficial to reducing product deterioration, decay, pathogens, or discoloration, etc.

In an example of the present disclosure, requires a custom high capacity band sealer or custom heavy duty double seal impulse heat sealer mechanism to create a proper leak proof seal, it may be replaced with an apparatus that may twist and loop the bin liner material and then, either by cinch tie, tape, or heating, complete the closure. The top of the twisted liner may be looped back to enclose in the seal.

In an example of the present disclosure, the bin liner may remain fully open and may be pulled along the top sides of the bin (e.g., akin to the state of the liner and bin at the time of harvest or initial placement of the product within the bin. In a first stage, an apparatus may pull a top sheet across the top of the bin. Next, in a second stage, the apparatus may use mechanical brushes or fingers to push any excess of the liner down the multiple sides of the bin. Then a third stage, the apparatus may use a tape application apparatus to wrap around the top sheet and adhere it to the bin and bin liner. Once again, additional stages can pull a vacuum, insert nitrogen, ozone gas for sanitation, or other functional substances beneficial to reducing product deterioration, decay, or discoloration, etc.

In an example of the present disclosure, the design of the bin may be modified. The modified bin may create certain features conducive to improved usage. The bin liner may not a bag, instead may be more like a sleeve that is fabricated out of and/or molded of a semi-rigid plastic material. The bin liner may be capable of retaining shape and fit within the bin, the liner matching up with the top of the bin. The molded shape may be created to enable nesting of multiple bin liners for efficient shipment prior to use. The top of the bin liner may have a lip design that may click seal to a fitted lid designed to fit the perimeter of the liner. This seal may also be supported via a heat-sealing mechanism. If applied before cooling, the lid may have perforations that may be exchanged with a non-perforated lid or taped closed after the cooling and nitrogen addition steps of the overall process. Otherwise, the lid may be applied and sealed after cooling. Once again, additional stages can insert nitrogen, ozone gas for sanitation, or other functional substances beneficial to reducing product deterioration, decay, or discoloration, etc.

In an example of the present disclosure, the bin may be configured for use without a liner. The bin may be rigid and weight supporting, such that the bin may be used without a liner or sleeve. The bin may have the design elements and airtight qualities of the liner, such as, for example, but not limited to, ability to nest with other bins, ability to seal with the plastic cap or lidding material, etc. In examples, the bin, cap, and/or lidding material may be plastic but may also be made of any suitable material. Once again, additional stages can pull a vacuum, insert nitrogen, ozone gas for sanitation, or other functional substances beneficial to reducing product deterioration, decay, or discoloration, etc.

In any or all of the examples discussed herein, the once the bin liner is sealed, a variety of nozzle configurations, ports and process cycles may be used to pull vacuum, add gasses or functional substances within the sealed bin liner, and then the ports can be sealed, or nozzle intrusion points would be taped or closed, such as described herein. The addition of sanitizer and/or other substances or functional substances within the gas phase of the bin flushing and/or bin sealing may provide an opportunity to reduce the microorganism levels that contribute to decay, deterioration, and discoloration of the product contained within the bin and/or liner, as well as provide a level of safety as a protection from pathogenic organisms.

As a system, process factors that may be managed and controlled as they relate to specific commodities or packing systems may include, but are not limited to, liner material type, plastic liner material type, and liner thickness, temperatures used to achieve the seal without burning or damaging the liner, sequence of steps pull a vacuum, to add the primary gas nitrogen or industrial gas for the modified atmosphere, functional substances to sanitize, protect, preserve, or enhance the value of the perishable, or any combination thereof.

One factor of the examples of the present disclosure is the timeline from arrival of the bin with the product therein to transportation of the bin to a cooler. As the bins are placed directly onto the cooling conveyor and rack, the time and labor to prep the bins is eliminated. After cooling, the bins again are placed on the automatic sealing and treating conveyor system to complete their closure/sealing/treatment. The present disclosure may reduce manual steps, which may yield time savings, for example, a total time savings of at least 30 minutes from the original 2 hours. Reducing the 30-minute manual steps may result in labor cost savings and may allow for additional cooling and bin processing volume to occur during each work shift.

At the processing facility, there are further advantages to the sealing methods and systems described herein Eliminating the zip tie may remove any risk for foreign material contamination. Using a recyclable bin and lid for the overall process allows for easier automation, reduces waste, and improves safety at the processing facility. Alternatively, using a top sheet sealed to a bin liner pulled tight to the top of the bin provides an opportunity to slit the top sheet and dump the product while holding the bin liner in place so it will not fall into the hopper.

Figure 1B:
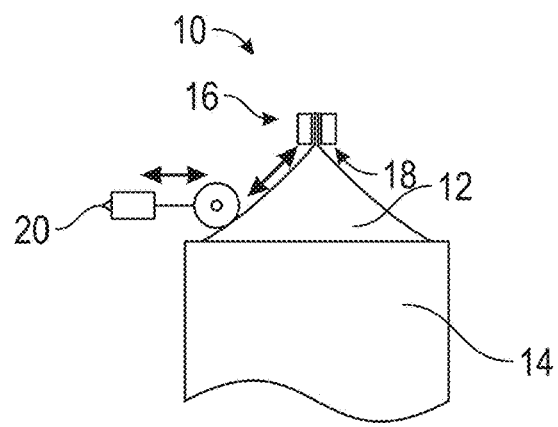
FIG. 1B illustrates the twist, loop, and tape seal apparatus of the system of FIG. 1A, according to an embodiment of the present disclosure.

In an exemplary process, the bins of harvested product arrive from the field to the vacuum cooling facility with a protective lid or vented cap, or screen cover is placed over the bin for transport to the cooling facility. There, the bins are unloaded and placed directly on a conveyor where any non-vented lid caps are removed (manually or robotically-mechanically) and vented lid-caps or screen covers remain. For double stacking, a special frame or racking design is added to the conveyor system. Bins are placed on the movable racks. The rack includes a protective cover (ex. floor and back plate) to prevent foreign material falling into the bottom bins. The bins then move into the vacuum precooling system and are cooled to 32-34 F. Without the narrow restriction caused by the zip tie, this method allows the vacuum cooling process and N2 addition to be accomplished faster, safer, and more efficient than the current method. Physical space, time and labor costs are saved by being able to place the bins directly on the conveyor to the vacuum cooling tube, instead of spacing on a receiving yard for 4-sided access by labor. The top of the bin is protected from any foreign material falling into the space with the perishable product. After vacuum cooling, the bins are set and then move via a conveyor along a closure process line eliminating the extra handling, separation, and manual closure steps. A first stage may involve removing any reusable vented lids for cleaning, return, and reuse to the harvest operation. Any bins with bag liners but without covers, caps or lids then proceed with de-cuffing the top portion of the bin liner from bin. A second stage involves capturing the bin liner using a mechanical device with clips or "robotic fingers" to grab, pull, straighten, and hold the bin liner vertically above the bin. The apparatus for de-cuffing, elevating, straightening, and stretching or holding the liner bag may include one or more nozzle-fingers for vacuuming or adding industrial gas or applying substance treatments inside of the bin liner bag during conveyance, prior to, and/or in conjunction with the sealing process. A next stage involves the use of a band sealer to pull the liner material to a central connection, and then using a heated or other means to melt the liner creating the seal. In conjunction with or after the bin bag is sealed, additional stages can insert nozzles to pull a vacuum, add nitrogen, a sanitizer such as ozone gas, or other functional substances beneficial to reducing product deterioration, decay, safety, or discoloration Referring now to the figures, in an exemplary process illustrated in FIGS. 1A and 1B, a band sealer or impulse heat sealer mechanism is replaced with an apparatus that will twist the bin liner material and then either be taped or heated to complete the closure. A special feature of this is to loop the top of the twisted liner back and enclose in the seal. FIG. 1A depicts a twist and tape seal apparatus that twists the top of the bin liner and then a taper applies the tape to complete the seal. FIG. 1B depicts the injection of a modified atmosphere and/or functional treatment into the bin in conjunction with an apparatus using a twist and heat seal step. This method and apparatus yield a closure close in appearance and function to the zip tie.

For example, FIGS. 1A and 1B depict a system 10 for sealing a liner 12 in a bin 14. The bin 14 may be placed on a pallet 15 on a conveyor 140. The conveyor 140 may transport the bin 14 to a station including an apparatus 16. The liner 12 may be a bag. The liner 12 may be plastic, may be a plastic bag, may be a sheet, or may be any other material described herein. The system 10 may include a twist and tape seal apparatus 16. The apparatus 16 may gather the loose ends of the material of the liner 12 and twist the liner 12 to form a twisted portion 18. The twist and tape seal apparatus 16 may apply heat to the twisted portion 18 to seal the liner 12 with a heat sealer 19. This may complete the seal of the liner 12. Within the liner 12, once sealed with the apparatus 16 and taper 20, may be a sealed enclosure. That is, for example, the apparatus 16 may gather the end surfaces of a bag together, twist the ends of the bag, and heat seal the twist portion to secure the bag and thus create a sealed enclosure within the bag (e.g., within the liner 12).

Once the sealed enclosure has been created, a modified atmosphere may be created within the sealed enclosure, as described herein or as described in co-pending International Application No. PCT/US2022/030263. As shown in FIG. 1A, an injection system 22 may include a nozzle 24 and a hose 26. The injection system 22 may pull a vacuum or have a controlled vent to control pressure and then inject a modified atmosphere and/or a functional treatment into the sealed enclosure. The vacuum and injection may occur sequentially in either order or simultaneously. The injection system 22 may be the same as, or similar to, the injection systems described with respect to PCT/US2020/067731 or PCT/US2022/030263. The nozzle 24 may be inserted into the liner 12 such that the substance and/or modified atmosphere may be delivered into the sealed enclosure of the interior of the liner 12. The nozzle 24 may be a gas nozzle. The injection system 22 may be operated in conjunction with the twisting and sealing steps. Alternatively, or additionally, the injection system 22 may be operated after sealing of the liner 12, at which point, the liner 12 may be sealed again. Alternatively, or additionally, the injection system 22 may be operated before sealing of the liner 12. The injection system 22 may include one or more nozzles, such as, for example, multiple nozzles and/or nozzles with multiple distribution zones (e.g., such as an outer zone for vacuum or venting and a center delivery zone for nitrogen and substances). The vacuum and/or controlled vent may be operated to maintain a neutral to slight negative pressure during the injection steps and to capture any sensitive atmosphere or substances from leaking to the immediate operating area for the safety of personnel and the environment. A taper 20 (FIG. 1B) may apply tape or other adhesive to seal the hole created by puncturing of the liner 12 with the nozzle 24. This maintains the modified atmosphere within the liner 12 and can occur simultaneously with or immediately after removal of the nozzle 24.

Figure 2A:
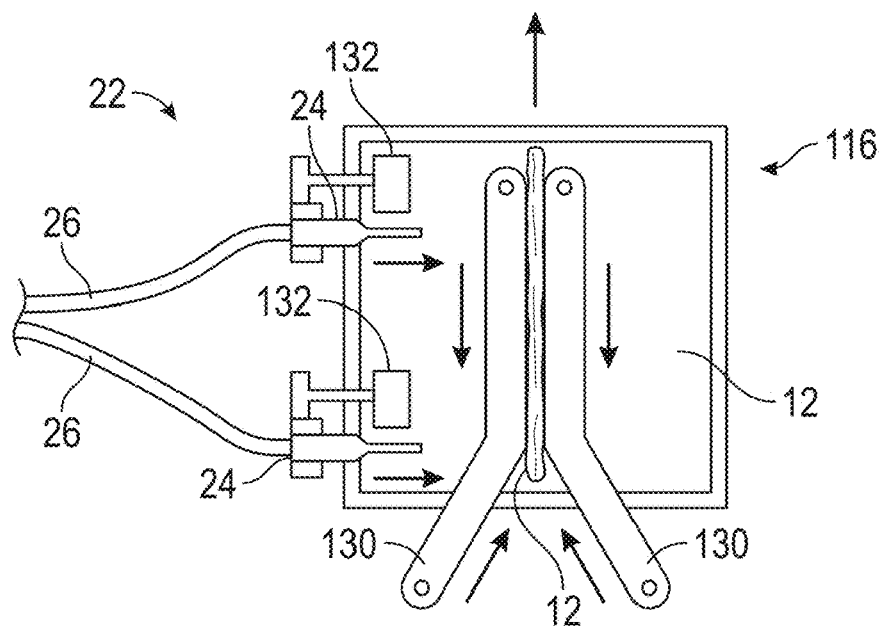
FIG. 2A illustrates a pulling and heat-sealing apparatus for a liner of a bin, according to an embodiment of the present disclosure.

FIG. 2A depicts a top down view of an apparatus 116 that combines the injection system 22 and the twisting and tape seal apparatus 16. In the apparatus 116, one or more pulleys 130 may grab or pull a liner 12 for twisting and heat sealing, as previously described. One or more nozzles 24 may be inserted into the liner 12 for injecting one or more substances into the sealed enclosure within the liner 12. For example, the one or more nozzles 24 may be gas injection nozzles providing a substance or material from the hose 26. The one or more nozzles 24 may be the same as or similar to those previously described or as those described in PCT/US2020/067731 or PCT/US2022/030263. The apparatus 116 may include one or tapers 132 for sealing the pierced hole or opening caused by the one or more nozzles 24. A taper 132 may be provided for each nozzle 24 or one taper 132 may be provided for all nozzles 24. The taper 132 may be the same or similar as described herein or as those described in PCT/US2020/067731 or PCT/US2022/030263. The apparatus 116 may pull the top of the bin liner 12 for heat sealing while nozzles 24 pierce the liner 12 for injecting a modified atmosphere and/or functional treatment and then a taper 132 seals the nozzle penetration hole. The entire process or sub steps therein may occur simultaneously. Any of the components in FIG. 2A may be automated/automatic.

Figure 2B:
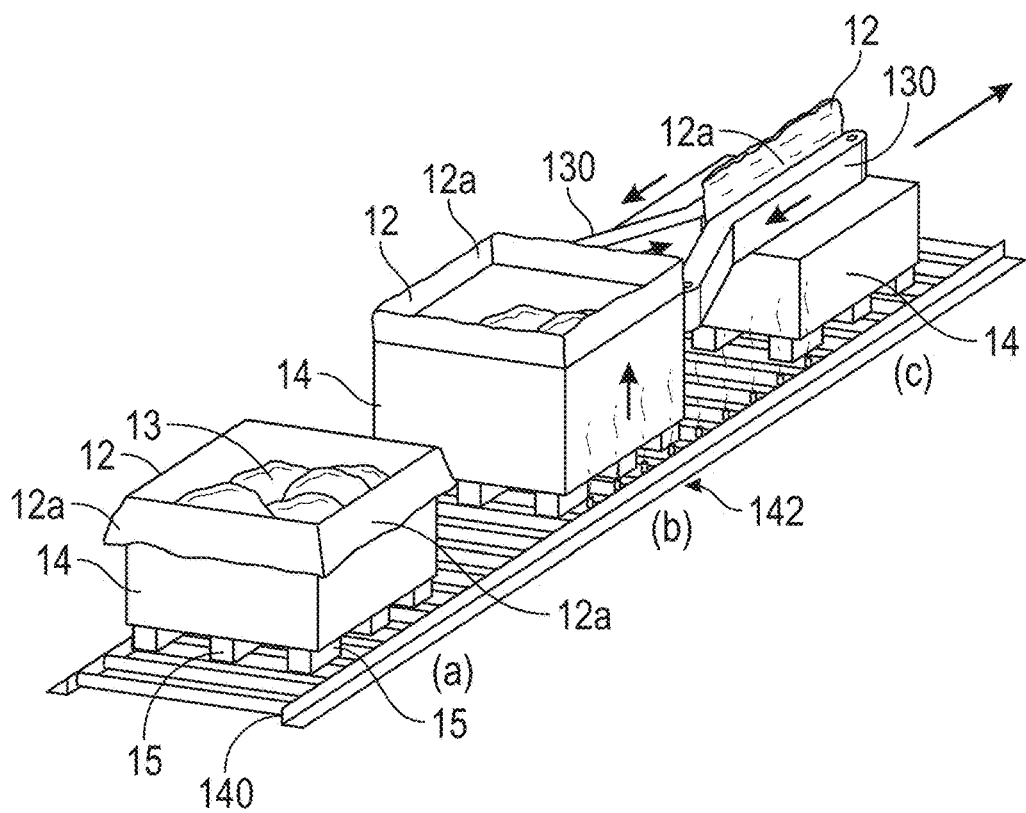
FIG. 2B illustrates a conveyor with a bin, according to an embodiment of the present disclosure.

FIG. 2B shows an exemplary system and method having a bin 14 on a pallet 15 that may move along the conveyor 140. The bin 14 may move from a first stage (a), to a second stage (b), and to a third stage (c). The bin 14 may include a liner 12, as described herein. In the first stage (a), the liner 12 may be open within the bin 14. A product 13 may be placed within the liner 12. The product 13 may be a perishable product, produce, or other product. The sides 12a of the liner 12 may hang down over a top of the bin 14. As mentioned previously, the liner 12 may be a bag, sheet, or other liner that may be gathered for sealing as described herein. In the second stage (b), an air manifold 142 may blow air upward from the conveyor 140. The air from the air manifold 142 may cause the sides 12a of the liner to move toward a vertical orientation. In the third stage (c), an apparatus, such as the apparatus 16 and/or the apparatus 116, may grab the sides 12a of the liner 12, twist and heat seal the sides 12a. For example, the pulleys 130 are shown grabbing the sides 12a of the liner 12. After third stage (c), the liner 12 may be sealed such that the interior forms a sealed enclosure. Simultaneously with the third stage (c), and/or subsequently to the third stage (c), a modified atmosphere may be provided to the sealed enclosure with an injection system, as described herein and in PCT/US2020/067731 or PCT/US2022/030263. Thus, FIG. 2B depicts a conveyor 140 with bins which illustrate a bin 14 with liner 12 pulled along the sides of the top as the bin 14 arrives from the field, and then air manifolds 142 blow the liner 12 up vertically while the liner 12 enters into the pulleys (e.g., pulleys 130) to pull the liner 12 closed and heat seal the liner 12.

Figure 7:
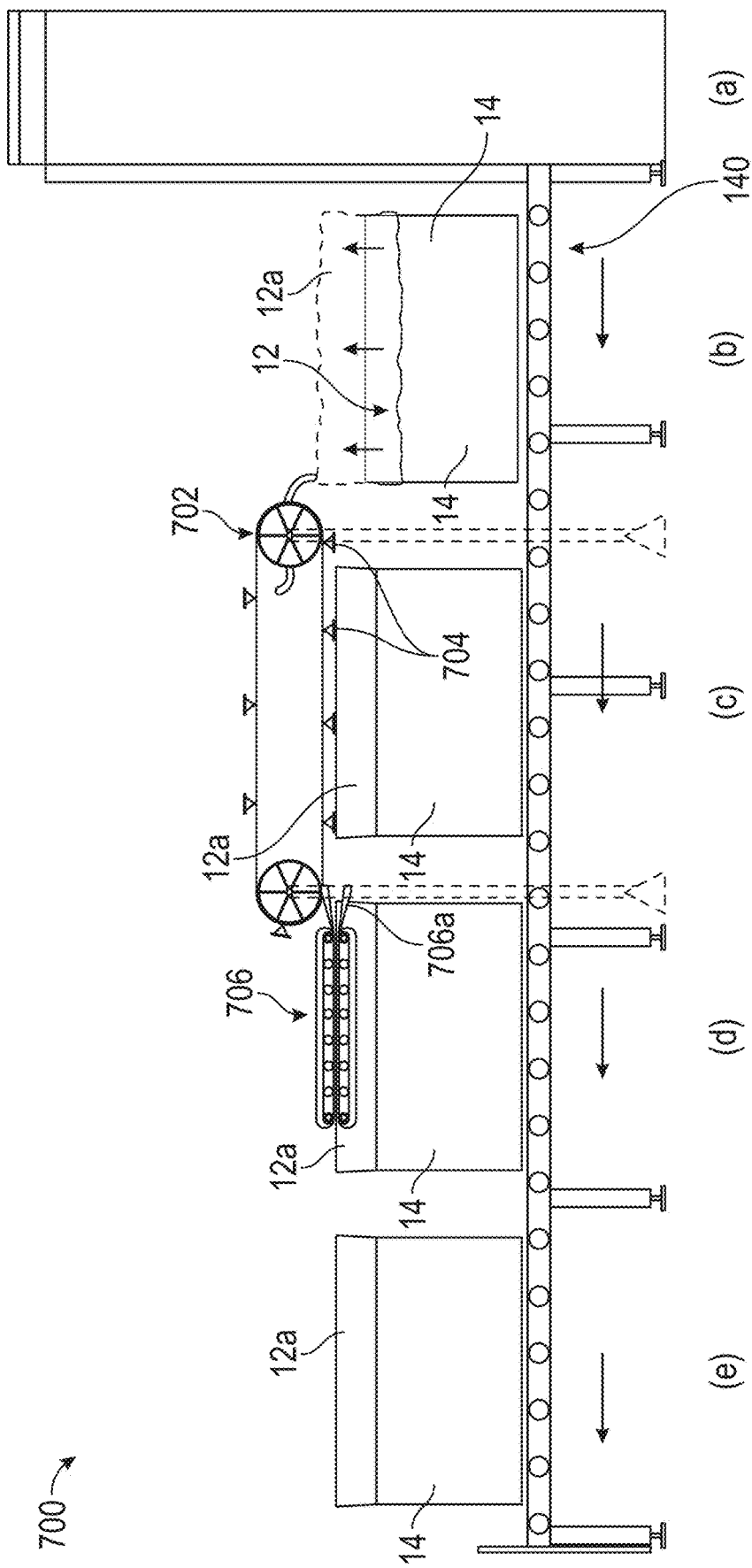
FIG. 7 illustrates a system having a conveyor with a bin, according to an embodiment of the present disclosure.

Stated another way, FIG. 2A depicts a top-down view of an apparatus that pulls the top of the bin liner for heat sealing while one or more nozzles pierce the liner for injecting a modified atmosphere and/or functional treatment and then a taper or taping device or sealing device may seal the nozzle penetration hole. FIG. 2B depicts a conveyor with bins which illustrate a bin with liner pulled along the sides of the top as it arrives from the field, and then air manifolds blow the liner up vertically while it enters into the pulleys to pull closed and heat seal. FIG. 7 shows the process line immediately after the vacuum cooler where nitrogen has been injected which de-cuffs the bin liners, grabs and holds tight the extended bin liner, and the heated band sealer seals the liner together to produce a completed, sealed MAP bin. FIG. 8 shows a closer inspection of the apparatus design to grab and hold the bin liner while it is in motion along a conveyor.

Figure 3A:
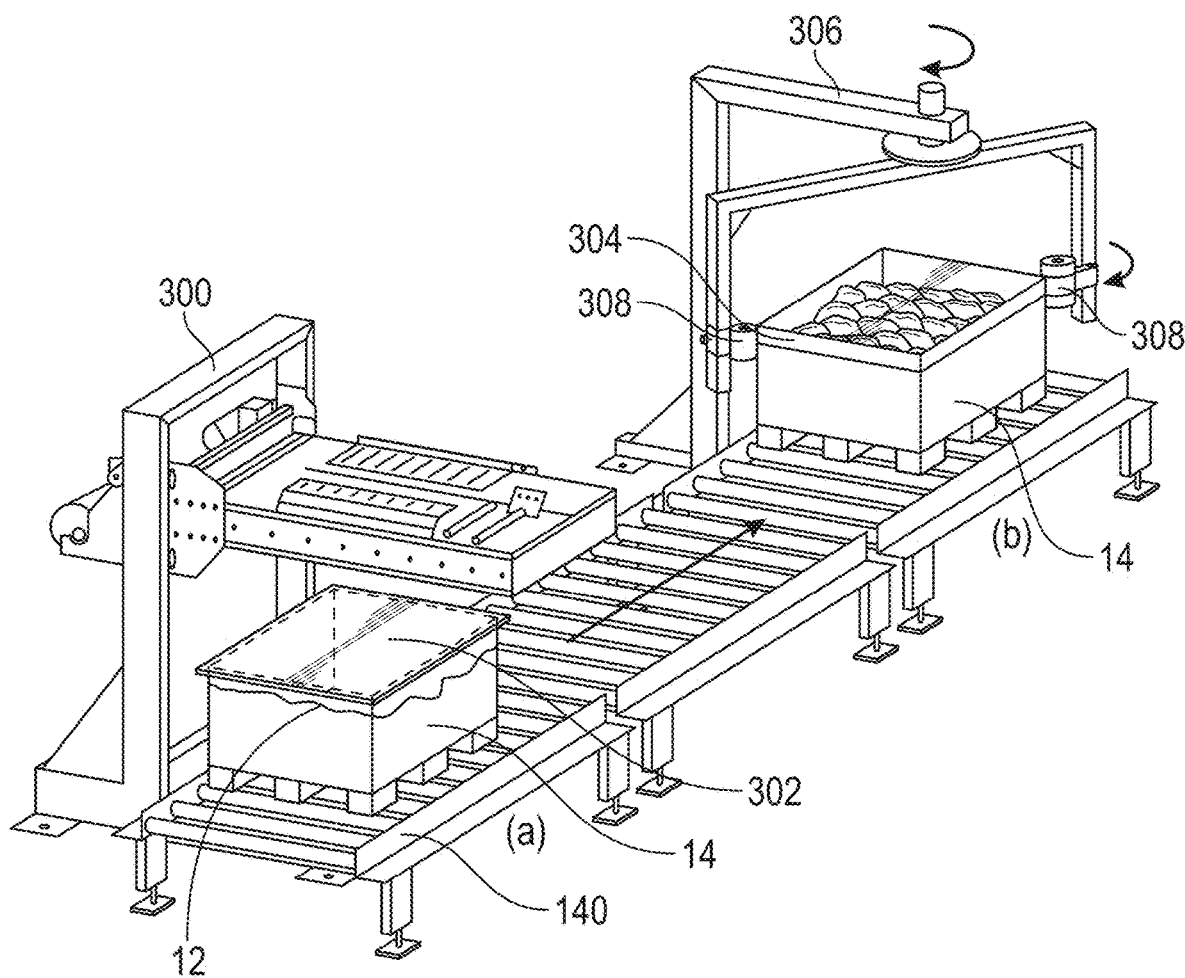
FIG. 3A illustrates a system having a conveyor with a bin, according to an embodiment of the present disclosure.
Figure 3B:
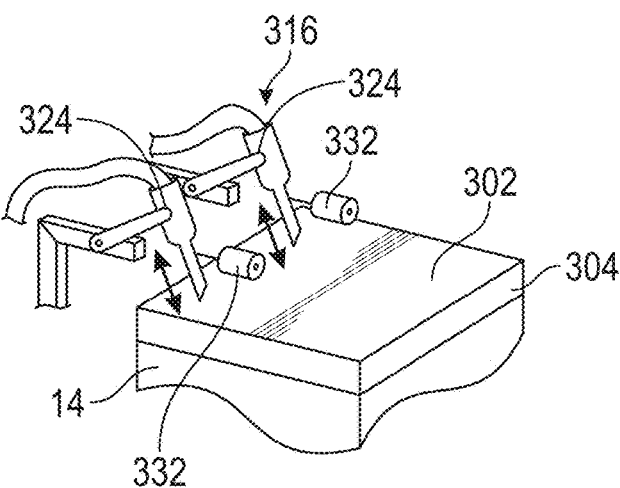
FIG. 3B illustrates a bin having a top sheet with nozzles for insertion through the top sheet, according to an embodiment of the present disclosure.
Figure 3C:
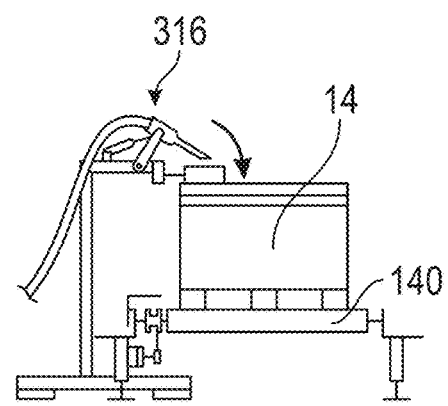
FIG. 3C illustrates a top sheet taper and gas infusion apparatus, according to an embodiment of the present disclosure.

In an exemplary process shown in FIGS. 3A to 3C, with the bin liner remaining fully open and pulled along the top sides of the bin, as it would be at the time of harvest, a first stage apparatus pulls a top sheet across the top of the bin, a second stage uses mechanical brushes or fingers to push the excess of the liner down the multiple sides of the bin, and then a third stage uses a tape application apparatus to wrap around the top sheet and adhere it to the bin and bin liner. Once again, additional stages can insert nitrogen, ozone gas or other atomized sanitizer for sanitation, or other functional substances beneficial to reducing product deterioration, decay, or discoloration. Vacuum and/or controlled vent may be operated to maintain a neutral to slight negative pressure during the injection steps, alternatively a slight positive pressure may be created temporarily or applied as part of a venting and/or an injection cycle and a containment device, pad, or covering may be utilized as needed. These methods significantly improve the containment and assure the capture of any sensitive atmosphere or substances from leaking to the immediate operating area for the safety of personnel and the environment.

FIG. 3A depicts a perspective view of a top sheet taped to the bin liner and bin to create a seal and then gas nozzles are used to penetrate the top sheet and inject a modified atmosphere and/or functional treatment and then the penetration points are taped to seal closed. FIG. 3B shows the conveyor with apparatuses to mechanically apply the top sheet and then to wrap around tape seal the top sheet. FIG. 3C shows the end view of the top sheet taper and gas infusion apparatus.

Stated another way, FIGS. 3A to 3C show an exemplary system and method having a bin 14 that may move along the conveyor 140. The bin 14 may move from a first stage (a) to a second stage (b). The bin 14 may include a liner 12, as described herein. In the first stage (a), an automatic or semi-automatic apparatus 300 may apply a top sheet 302 to the bin 14. The apparatus 300 may be top sheet dispenser. The top sheet 302 may have sides that hang over the sides of the bin 14 and overlap at least a portion of the liner 12. In the second stage (b), a tape 304 may be applied around the perimeter of the bin 14. The tape 304 provided automatically or semi-automatically with an apparatus 306. The tape 304 may extend around the liner 12 and the top sheet 302. The apparatus 306 may include a taper device 308 that may tape the top sheet 302 to the liner 12 with the tape 304. When taped, the top sheet 302 and liner 12 may form a sealed enclosure. Simultaneously with the second stage (b), and/or subsequently to the second stage (b), a modified atmosphere may be provided to the sealed enclosure with an injection system, as described herein and in PCT/US2020/067731 or PCT/US2022/030263.

FIG. 3B depicts a top down perspective view of an apparatus 316 that may be an injection system. The apparatus 316 may be the same as or similar to the injection system 22. One or more nozzles 324 may be inserted into the top sheet 302 for injecting one or more substances into the sealed enclosure within the liner 12 (not visible) as described herein. For example, the one or more nozzles 324 may be gas injection nozzles. The nozzles could be for vacuum or controlled venting. The nozzles 324 may be supported with containment pads or could have a mechanism that provides an aspirator hood or covering device to capture any leaking gas or substance. The apparatus 316 may include one or tapers 332 for sealing the pierced hole or opening caused by each of the one or more nozzles 324. In other words, in FIG. 3B, a top sheet 302 is depicted taped (via tape 304) to the bin liner 12 and bin 14 to create a seal and then gas nozzles 324 are used to penetrate the top sheet 302 and inject a modified atmosphere and/or functional treatment into the sealed enclosure and then the penetration points are taped to seal closed. FIG. 3C illustrates an end view of the system of FIG. 3A. The process or any component thereof may be automated.

Figure 3D:
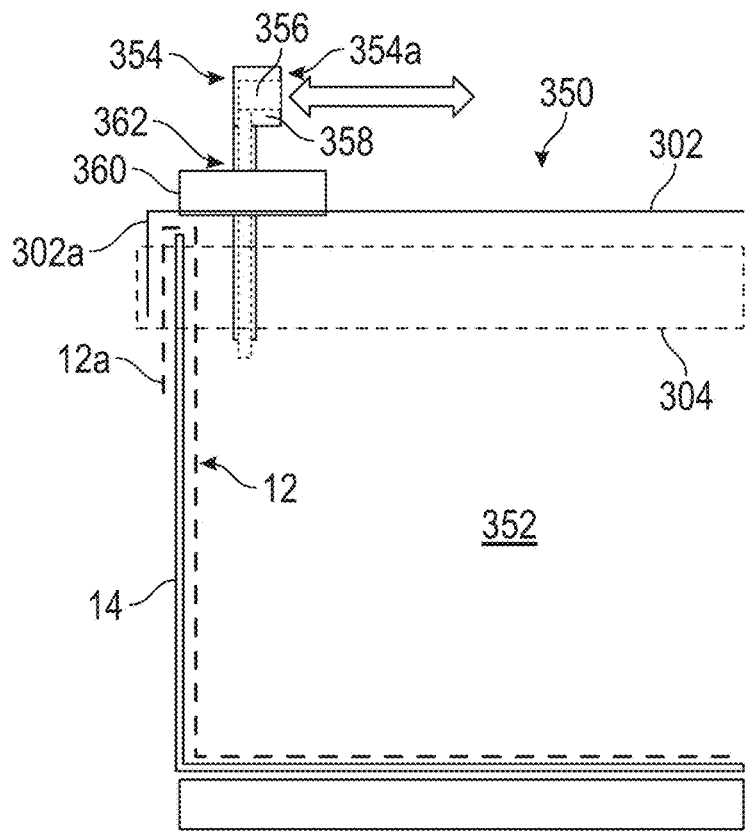
FIG. 3D illustrates a sealed bin enclosure, according to an embodiment of the present disclosure.

FIG. 3D show a partial view side view of a sealed bin enclosure 350. The sealed bin enclosure 350 includes a bin 14, a liner 12, and a top sheet 302. As mentioned, the liner 12 may have sides 12a that hang over or extend over an upper surface of the bin 14. Likewise, the top sheet 302 may have sides 302a that hang over or extend over the sides 12a and the upper surface of the bin 14. The liner 12 and the top sheet 302 may be sealed with tape 304 to create a sealed enclosure 352 within the bin 14. The product may be located within the sealed enclosure 352. The tape 304 or plastic wrap may extend around the sides 12a and the sides 302a to seal the top sheet 302 to the liner 12.

A nozzle 354 may be provided to inject and/or remove (e.g., suction or vacuum) a substance within the sealed enclosure 354 as described herein and as described in PCT/US2020/067731 or PCT/US2022/030263. The nozzle 354 may pierce the top sheet 302 or other portion of the liner 12 or bag enclosure and be inserted into the sealed enclosure 352 for injection therein. The nozzle 354 may include a first passage 356 and a second passage 358. The first passage 356 may be an injection passage. The first passage 356 may be a center injection nozzle. The first passage 356 may inject a gas, treatment substance, or other substance into the sealed enclosure 352. The second passage 358 may be a vacuum and/or venting passage. The second passage 358 may be a perimeter nozzle. The second passage 358 may be an annular passage extending around the central first passage 356. During operation, the first passage 356 may inject a substance into the sealed enclosure 352 and the second passage 358 may remove (e.g., vacuum and/or vent) gas, substance, or air from the sealed enclosure 352. Together, the injection and vacuuming and/or venting may allow creation of a modified atmosphere within the sealed enclosure 352. A hose (not shown) may be connected and/or fluidly coupled to an end 354a of the nozzle 354. The injection and vacuuming/venting may occur simultaneously, sequentially with injection occurring first, sequentially with vacuuming/venting occurring first, or combinations thereof. Although the first passage 356 is described for injection and the second passage 358 is described for vacuuming and/or venting, the functions of the first passage 356 and the second passage 358 may be reversed.

With continued reference to FIG. 3D, a pad 360 may be provided for maintaining a seal around the nozzle 354 at a location where the nozzle 354 pierces the top sheet 302. The pad 360 may be a containment device, containment pad, aspirator hood, pad, sealing sleeve and/or small cover device or chamber. The nozzle 354 may enter and exit the sealed enclosure 352 through the pad 360, as the sealed enclosure 352 is resealed. The pad 360 may be a pressure pad. The pad 360 may be according to the pads described in PCT/US2020/067731 or PCT/US2022/030263.

Figure 3E:
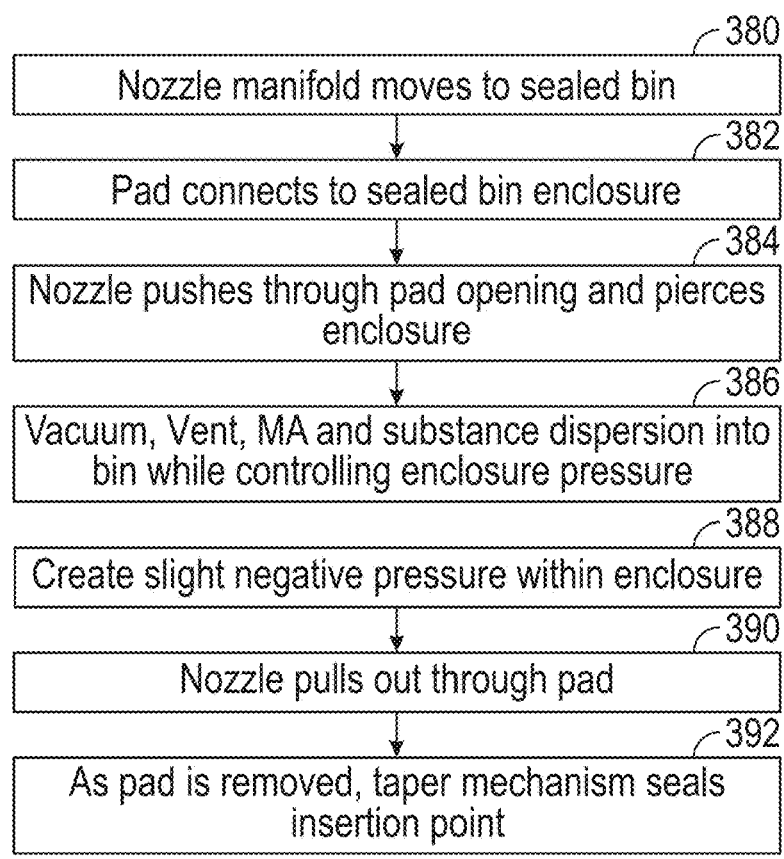
FIG. 3E illustrates a process for piercing a sealed bin enclosure, according to an embodiment of the present disclosure.

During operation, and referring to FIGS. 3D and 3E, at step 380, the nozzle 354 moves to the sealed bin enclosure 350. At step 382, the pad 308 connects or couples to the sealed bin enclosure 350. For example, the pad 308 may connect to the top sheet 302. at step 384, the nozzle 354 may push through an opening 362 in the pad 360. The nozzle 354 may then pierce the sealed enclosure 352 (e.g., may pierce the top sheet 302 and/or the liner 12). At step 386, vacuum, vent, modified atmosphere, and/or substance dispersion into the sealed enclosure 352 of the bin 14 may occur while controlling the pressure within the sealed enclosure 352. At step 388, a slight negative pressure may be created within the sealed enclosure 352 and then, at step 390, the nozzle 354 may be removed or pulled out through the pad 360. The slight negative pressure may prevent the substance injected into the sealed enclosure 352 from leaking out of the sealed enclosure 352. At step 392, as the pad 360 is removed from the sealed bin enclosure 350, a taper device (not shown), may seal the insertion point (e.g., the point at which the nozzle 354 pierced the sealed bin enclosure 350).

Although the process of FIG. 3D is shown and described with respect to a liner 12 and top sheet 302, the process of FIG. 3D may be employed with other arrangements. For example, with only a liner, within only a liner where the liner is a bag, with only a liner where the liner is twisted and sealed at the top, where the top sheet is instead a lid, etc.

In another exemplary process, the design of the bin is modified to create certain features conducive to improved usage. The bin liner is not a bag but more like a sleeve that is fabricated out of a semi-rigid plastic material to retain its shape and fit within the bin, matching up with the top of the bin. The molded shape is created to enable nesting of multiple bin liners for efficient shipment prior to use. The top of the bin liner has a lip design that will click seal to a fitted lid designed to fit the perimeter of the liner. This seal may also be supported via a heat-sealing mechanism or application of an adhesive for sealing a liner. If applied before cooling, the lid would have perforations that would be exchanged with a non-perforated lid or taped closed after the cooling and nitrogen addition steps of the overall process. Otherwise, the lid would be applied and sealed after cooling.

In another exemplary process, the rigid and weight supporting bin itself is configured to be used without a liner or sleeve and have the design elements of the previous bin liner, such as nest ability and to be able to seal with the plastic cap or lidding material. For example, FIG. 9 shows a high speed conveyor process where the bin itself is airtight and the apparatus places and seals a snap on lid.

Figure 4:
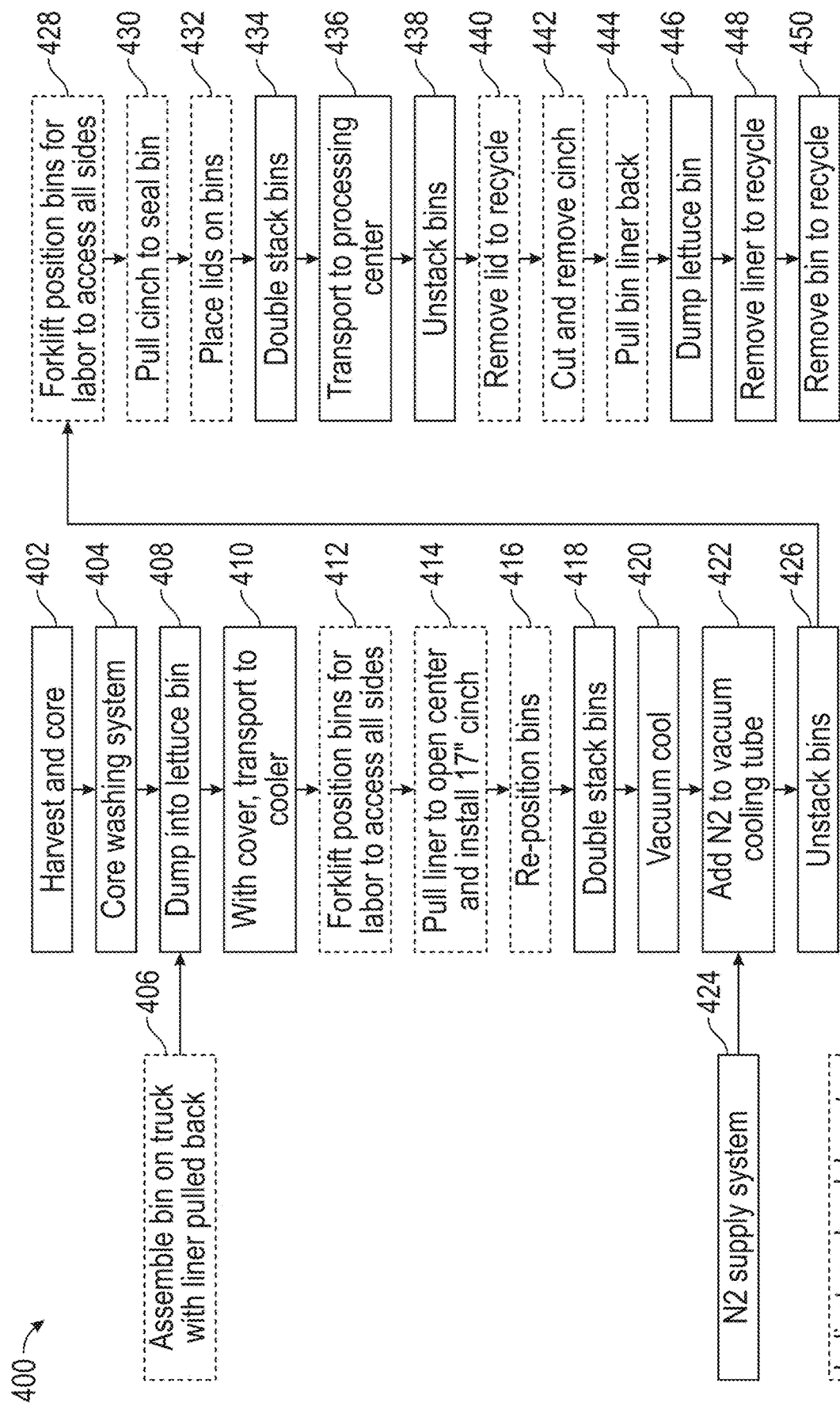
FIG. 4 illustrates a flow diagram of a bin process from harvest to the processing facility, according to an embodiment of the present disclosure.

FIG. 4 shows an exemplary flow diagram for a process 400 of placing product in a bin, in accordance with the present disclosure. In FIG. 4, the product is described as lettuce, however other products, including perishable products and/or produce, may be packed in bins in a similar process. The dashed boxes in FIG. 4 represent warehouse laborer steps. The other steps may be manual or automated. The flow diagram of FIG. 4 shows a bin process from harvest to cooling and then to use at the processing facility. First, at step 402, the product is harvested (and cored, as necessary). At step 404, the core is washed and at step 408, the lettuce is added to a bin. In step 406, prior to placing the lettuce in a bin, the bin is assembled and the liner inserted and pulled back to receive the product. At step 410, a cover placed on the bin and the bin is transported to a cooler. At step 412, a forklift positions the bins for labor to access all sides and, at step 414, the liner is pulled to open a center and install a 17" cinch. At step 416, the bins are re-positioned and at step 418, the bins are stacked. In step 420, the product is vacuum cooled and at step 422, $N_2$ is added to vacuum cooling tube from a $N_2$ supply system 424. In step 426, the bins are unstacked and in step 428, a forklift positions the bins for labor to access all sides. In step 430, the cinch is pulled to seal the bin. In step 432, a lid is placed on the bin, in step 434 the bins are double stacked, and in step 436, the bins are transported to a processing center. Once at the processing center, in step 438, the bins are unstacked, in step 440 the lids are removed and reused or recycled, and in step 442, the cinch is cut and removed. In step 444, the liner is pulled back, the lettuce is dumped from the bin for processing at step 446. Then in step 448, the liner is removed for reuse or recycling and in step 450, the bin is reused or recycled. Any of the steps may be omitted and or re-ordered in the process 400.

Figure 5:
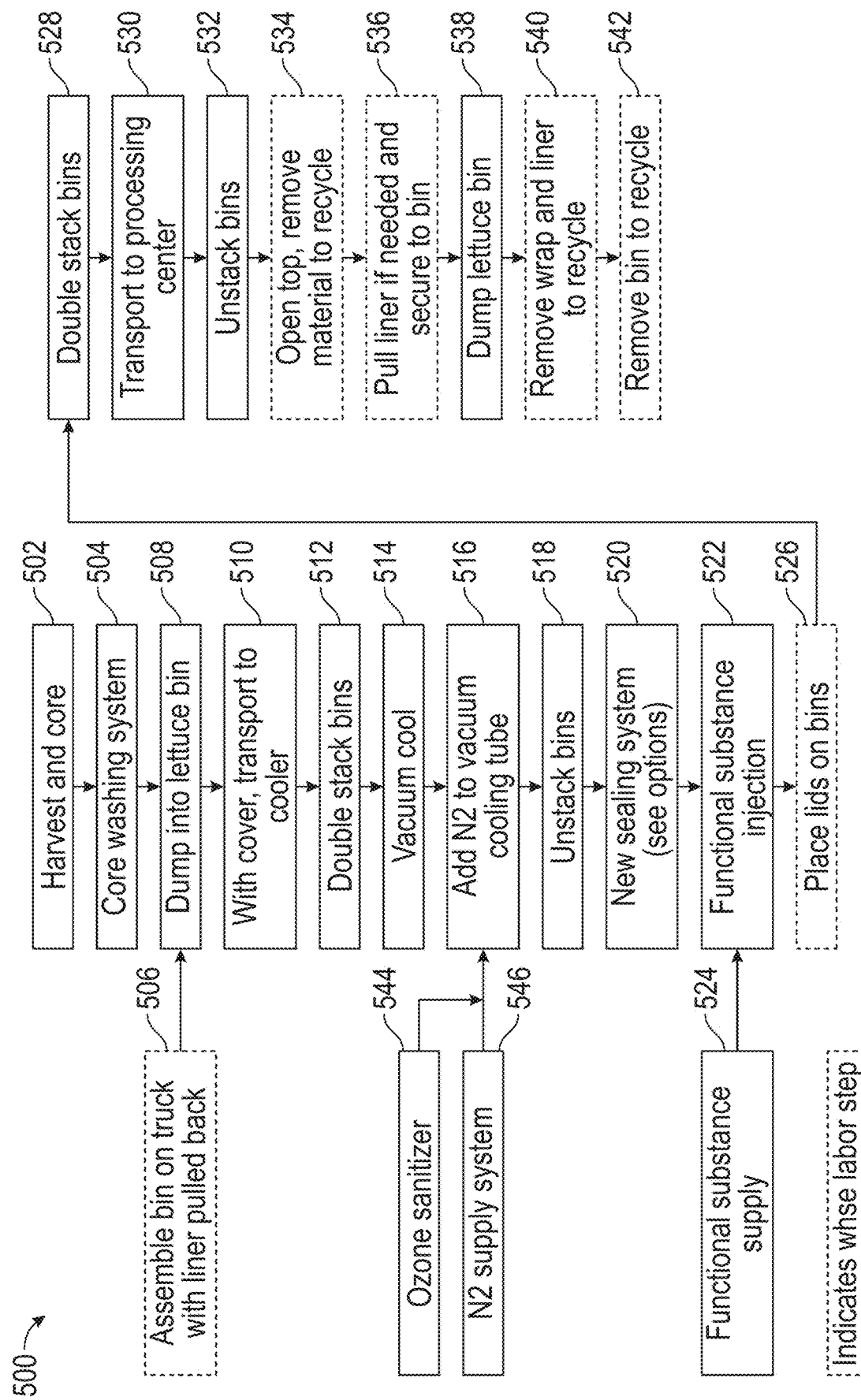
FIG. 5 illustrates a flow diagram of a bin process from harvest to the processing facility, according to an embodiment of the present disclosure.

FIG. 5 shows an exemplary process 500 for placing product in a bin. FIG. 5 shows a flow diagram showing the process steps for the new bin sealing system and with ozone or a gaseous or atomized sanitizer possibly added into the vacuum cooling tube before sealing and then other functional substances injected into the bin after sealing. In some examples, if the sanitizer or functional substances cannot be added effectively, safely, or because of potential damage to the vacuum cooling or pressure cooling equipment, the substance may be applied to the bin enclosures after cooling. The dashed boxes in FIG. 5 represent warehouse laborer steps. The other steps may be manual or automated. First, at step 502, the product is harvested (and cored, as necessary). At step 504, the core is washed and at step 508, the lettuce is added to a bin. In Step 506, prior to placing the lettuce in a bin, the bin is assembled and the liner inserted and pulled back to receive the product. At step 510, a cover placed on the bin and the bin is transported to a cooler. At step 512, the bins are double stacked. In step 514, the product is vacuum cooled and at step 516, $N_2$ and other substances, such as, for example, ozone or other sanitizers, are added to a vacuum cooling tube from a $N_2$ supply system 546 and ozone or a gaseous or atomized Sanitizer system 544. In step 518, the bins are unstacked and in step 520, the bins are sealed according to any of the exemplary processes described herein. In step 522 a functional substance may be injected from a functional substance supply 524. In step 526, a lid is placed on the bin, in step 528 the bins are double stacked, and in step 530, the bins are transported to a processing center. Once at the processing center, in step 532, the bins are unstacked and in step 534 the lids are removed and reused or recycled. In step 536, the liner is pulled back, the lettuce is dumped from the bin for processing at step 538. Then in step 540, the liner is removed for reuse or recycling and in step 542, the bin is reused or recycled. Any of the steps may be omitted and or re-ordered in the process 500.

Figure 6:
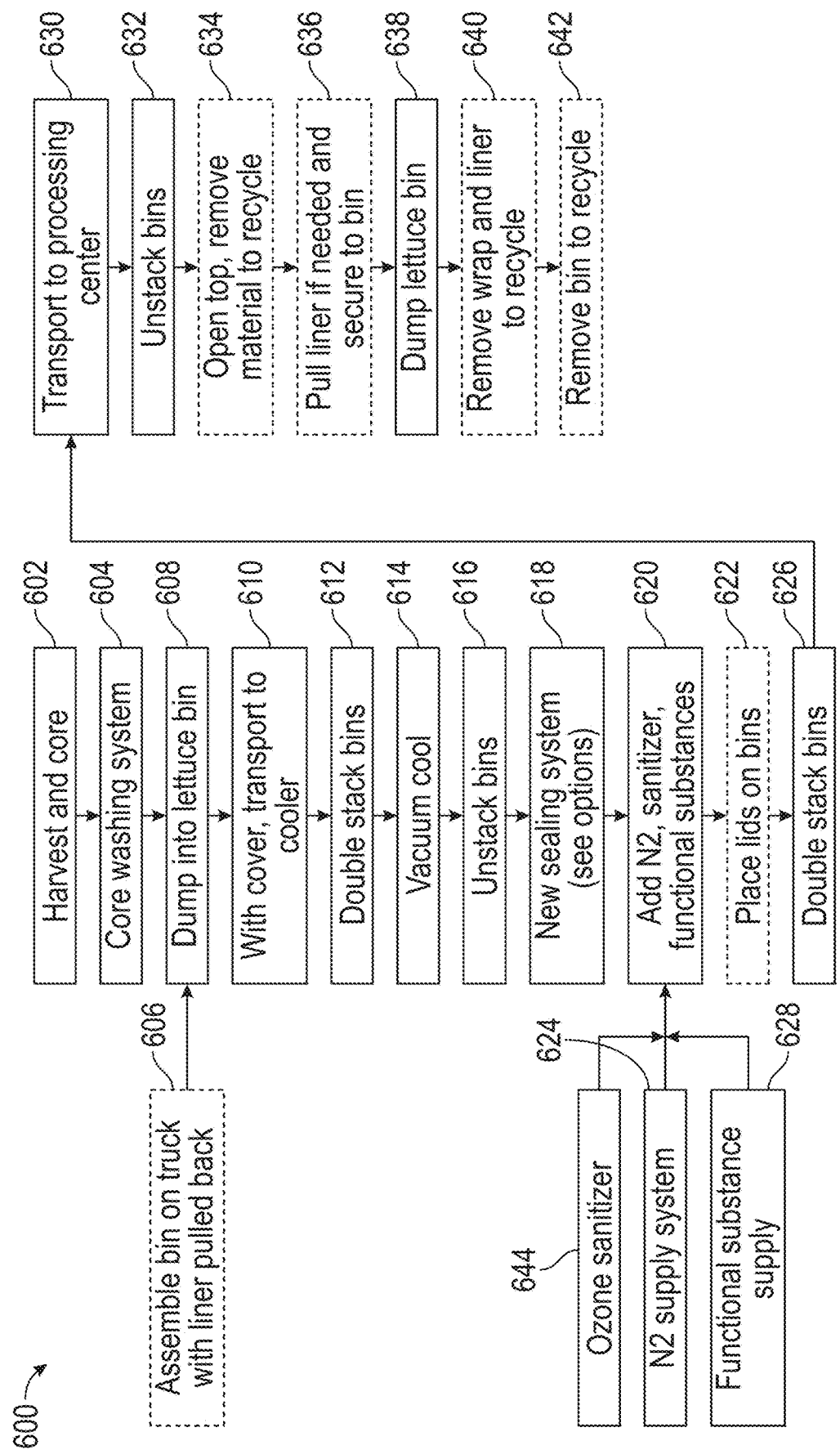
FIG. 6 illustrates a flow diagram of a bin process from harvest to the processing facility, according to an embodiment of the present disclosure.

FIG. 6 shows an exemplary process 600 for placing product in a bin. FIG. 6 is a flow diagram of the process showing the nitrogen gas, ozone, gas phase, or nebulized sanitizer, and functional treatments being added to the bin after sealing. The dashed boxes in FIG. 6 represent warehouse laborer steps. The other steps may be manual or automated. First, at step 602, the product is harvested (and cored, as necessary). At step 604, the core is washed and at step 608, the lettuce is added to a bin. In step 606, prior to placing the lettuce in a bin, the bin is assembled and the liner inserted and pulled back to receive the product. At step 610, a cover placed on the bin and the bin is transported to a cooler. At step 612, the bins are double stacked. In step 614, the product is vacuum cooled and at step 616, the bins are unstacked and in step 618, the bins are sealed according to any of the exemplary processes described herein. In step 620, nitrogen gas from a $N_2$ supply 624, Ozone sanitizer from an Ozone generator or sanitizer module 644, and/or functional substances from a functional substance supply 628 may be added to the bin. In step 622, a lid is placed on the bin, in step 626 the bins are double stacked, and in step 630, the bins are transported to a processing center. Once at the processing center, in step 632, the bins are unstacked and in step 634 the lids are removed and reused or recycled. In step 636, the liner is pulled back, the lettuce is dumped from the bin for processing at step 638. Then in step 640, the liner is removed for reuse or recycling and in step 642, the bin is reused or recycled. Any of the steps may be omitted and or re-ordered in the process 600. In some examples, the bin dumping apparatus may function by separating the bin from a pallet the bin was transported and delivered on. In some examples, the pallet may be captured by the bin dumping apparatus. In the case where the pallet is captured, contamination from the pallet, such as wood or foreign material, may fall into the hopper with the perishable product (e.g., a hopper for receiving the perishable product from the bin). To avoid this potential contamination, the pallet may be a plastic pallet or a slip sheet material may be included to reduce or eliminate the possibility of foreign material contamination.

FIG. 7 shows a process line immediately after the vacuum cooler where nitrogen has been injected which de-cuffs the bin liners, grabs and holds tight the extended bin liner, and the heated band sealer seals the liner together to produce a completed, sealed MAP bin. For example, FIG. 7 shows a bin 14 moving from right to left along a conveyor 140. First, the bin 14 may move through a vacuum cooling tube. The cooling may include $N_2$ and optional sanitizer treatment. Subsequently, the liner 12 within the bin 14 is de-cuffed, stretched, and/or straightened for positioning. After straightening of the liner 12, and/or in conjunction therewith, the liner 12 is supported with evenly matched edges at the liner is fed into the band sealer. As the band sealer applies heat and pulls the bag through the band sealer. This results in the sealed bin with a modified atmosphere therein.

Referring to FIG. 7, at stage (a), a bin 14 (not visible) i sin a vacuum cooler with nitrogen and optional sanitizer treatment. This results in a low oxygen and cold nitrogen in the liner 12 of the bin 14, at which time the liner 12 and bin 14 are ready to be sealed via stages (b) through (e). At stage (b), decuffing is performed to the liner 12 of the bin 14. The decuffing may be cause the sides 12a of the liner 12 to be raised vertically away from the sides of the bin 14. At stage (c), a system 702. The system 702 may be a wheel line that has grabs, hooks, bars or clips 704 for grabbing the sides 12a and maintaining the sides 12a in the vertical/straightened position. In stage (d), an apparatus 706, such as a band sealer, may seal the sides 12a to form the sealed enclosure. The apparatus 706 may be the apparatus 16 or the apparatus 116. The apparatus 706 may have an infeed 706a that intakes the sides 12a of the liner 12. The apparatus 706 may include multiple heating and cooling rollers to seal the sides 12a of the liner 12. At stage (e), the bin 14 may be a finished, sealed bin, with a modified atmosphere therein. The process shown in FIG. 7 may be a high speed conveyor process. Thus, FIG. 7 illustrates a system, method, and equipment for flow of bins, decuffing, bag feed and support and strengthening and sealing, as well as modified atmosphere inclusion.

Stated another way, FIG. 7 illustrates a system and process that adds bulk bins with product packed into a vacuum cooling and treatment system via a conveyor. Optionally, a vented or screen protection lid is included with the bin to prevent unwanted debris from falling onto the product within the liner of the bin. The product in the bin is cooled, nitrogen is added, and substance treatments are added to protect the product in the bin, slow respiration, and add prescribed benefits from the process treatments. After cooling and treatment, the bins are quickly conveyed to a decuffing station. Before the decuffing, the screen or vented lid is removed, if one was provided. The bin bag is decuffed by stretching or straightening of the bin bag for positioning of the next stage. After straightening of the bin bag and/or in conjunction with straightening of the bin bag, the uplifted portion of the bin bag is supported with evenly matched edges at the bag feeds into the band sealer for even, complete sealing of the bin bag. As the band sealer applies heat and pulls the bag through the sealer, excess air is removed.

The process and system of FIG. 7 allows for high capacity, high speed system to quickly and efficiently seal bins of products immediately after cooling and modifying the atmosphere within the bins before the colder nitrogen mixes with the warmer temperature air. The time available to accomplish this is variable, but typically is only a matter of minutes. Thus, the process from stage (a) to stage (e) may be less than ten minutes, may be less than 8 minutes, may be less than 5 minutes, may be between 0 minutes and ten minutes, or any subrange therein. Adhering to the time range allows for the modified atmosphere to be maintained in the bin after its application until the time at which it is sealed therein. Additionally, gas blends and substances or sanitizer treatments may be included. Reliable capture of the desired/prescribed modified atmosphere gas levels is achieved with the system and process of FIG. 7. The process of FIG. 7 can be repeatable continuous, and batch processed.

FIG. 8A shows a closer inspection of an apparatus 800 designed to grab and hold the bin liner while the bin is in motion along a conveyor. The apparatus 800 may be the system 702 of FIG. 7. As the bin 14 travels along the conveyor 140. The apparatus 800 includes a line 804 with devices 802 that extends overhead and may travel with the bin as the bin travels along the conveyor 140. The apparatus 800 may include clips, hooks or capture-grabbing devices 802 that may grasp and hold the edges or sides 12a of the liner 12. The devices 802 may be located on a line 804 that extends around wheels 806. The line 804 may continuously roll along the wheels such that the devices 802 continuously grab the sides 12a until the bin on the conveyor 140 approaches the heat sealer 808. That is, after the liner 12 of the bin 14 is decuffed, as described previously, the straightened, decuffed edges or slides of the liner 12 are grasped by the devices 802. The apparatus 800 may then feed the edges of the liner 12 into the heat sealer 808. At point 800a, the devices 802 may detach from the sides 12a to allow the sides 12a to be fed into the heat sealer 808. That is, the point 800a may be a clip detachment point. The heat sealer 808 may be the apparatus 706, the apparatus 16, or the apparatus 116. The heat sealer 808 may then seal the liner 12 to form the sealed enclosure therein. After released from the sides 12a at the detachment point 800a, the devices 802 may travel back to the beginning of the apparatus 800 to grab sides 12a of another bin.

FIG. 8B illustrates an alternative apparatus 810 that may be used in place of the apparatus 800. The apparatus 810 may include devices 812 that grab the four corners of the sides 12a. The devices 812 may be robotic. The devices 812 may decuff the sides 12a and travel along a line 814 that allows the sides 12a to maintain a straightened position. The apparatus 810 may extend over the bin. The devices 812 may be robotic, articulating bag stretching or straightening devices. The devices 812 may be vacuum or mechanical grabs that stretch and/or straighten the sides 12a. As in FIG. 8A, the devices 812 may maintain the straightened position of the sides 12a until a detachment point 810a at the entrances to the heat sealer (not shown in FIG. 8B). After released from the sides 12a at the detachment point 810a, the devices 812 may travel back to the beginning of the apparatus 810 to grab sides 12a of another bin.

FIG. 9 depicts an automated bin sealing and MAP process 900 with robotic stages to de-cuff the liner, pull and hold tight the bin liner, and heat seal the liner. The robotic stages may include lifting the bag and/or de-cuffing the bag 12 or liner 12; straightening and stretching the bag at a middle point; continuing to stretch and straighten the bag while inserting the bag into lengthened in feed bands and/or rollers. Then, the bag may be inserted fully robot mechanism withdraws and returns to repeat the process at position. A second robotic apparatus may duplicate process and increase the overall speed. The robotic stages may be accomplished with a robotic shuttle that travels along the conveyor with the bin 14.

Referring to FIG. 9, at stage (a), the robotic shuttle may include a robot 902 on a track 904 for movement along the conveyor 140. At stage (a), the sides 12a of the liner 12 are decuffed by the robotic shuttle 902. At stage (b), the sides 12a are raised and straightened. A second robot 902a may be provided. The arms 904 of the robot may perform the decuffing, and the raising and straightening of the sides 12a shown in stages (a) and (b). After stage (b), the robot 902 may return to stage (a) for the next bin. At stage (c), the decuffed sides 12a are fed into rotating bands 906. The rotating bands 906 may seal the sides 12a. The rotating bands 906 may not use heat to seal the sides 12a. At stage (d), opposing heat sealers 908, or band sealer 908, may seal the sides 12a. The heat sealer 908 may be the heat sealer of any embodiment described herein. The heat sealer may include a drive band and heating and cooling rollers. As the sides 12a pass through the heat sealing band sealer, the sides 12a are sealed and a sealed enclosure is provided within the liner 12. The bin 14 moves to stage (e) where they are finished, heat sealed bags/bins 14b. The process and system 900 may be an automated bin sealing and modified atmosphere process and system.

Figure 10:
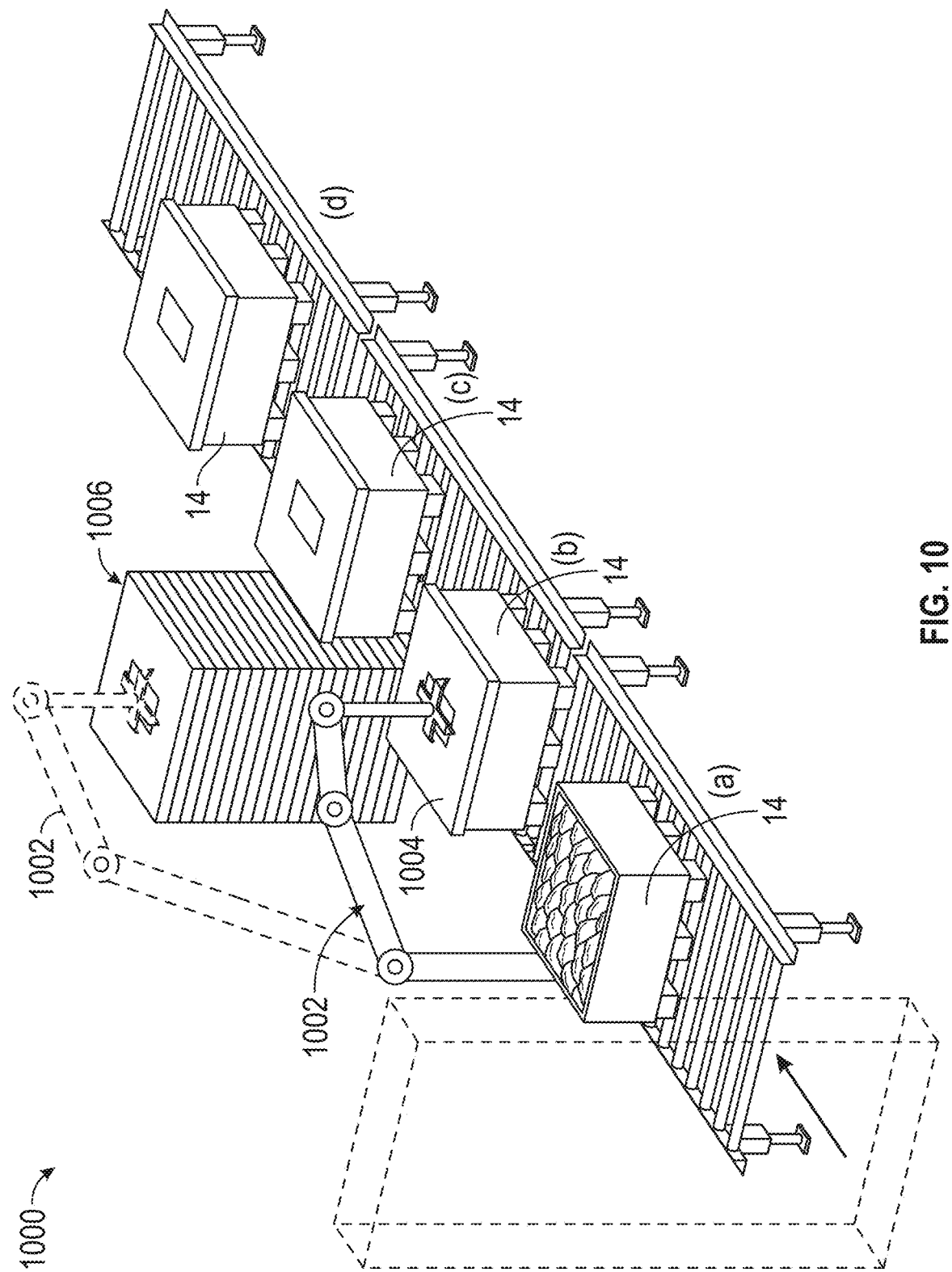
FIG. 10 illustrates a system having a conveyor with a bin, according to an embodiment of the present disclosure.

FIG. 10 shows a high speed conveyor process 1000 where the bin 14 itself is airtight and the apparatus 1002 places and seals a snap on lid 1004 from a stack of lids 1006. The lid 1004 may be a top lid placed and pressed to seal on the bin 14. The flex press snap in place. In stage (a), the bin 14 is ready to receive the airtight sealing top lid 1004. In stage (b), the top lid is placed and pressed to seal. This process may occur after the bin with product therein exits the vacuum cooling and oxygen purge with nitrogen and treatments tube. At stages (c) and (d), sealed bins are completed. The lid may include a seal, such as a silicone or rubber seal, that creates a seal between the lid and the bin such that the modified atmosphere is maintained within a sealed enclosure of the bin with the lid thereon. The lid may snap or otherwise click and connect onto the bin, such as, onto a lip of the bin. In the example of FIG. 10, the bins 14 may be stackable, nestable, collapsible, compressible, or foldable. In the example of FIG. 10, a liner may or may not be provided. That is, in some examples, the bin 14 may include a liner according to any embodiment described herein. In some examples, the bin 14 contains product without a liner therein.

Figure 11:
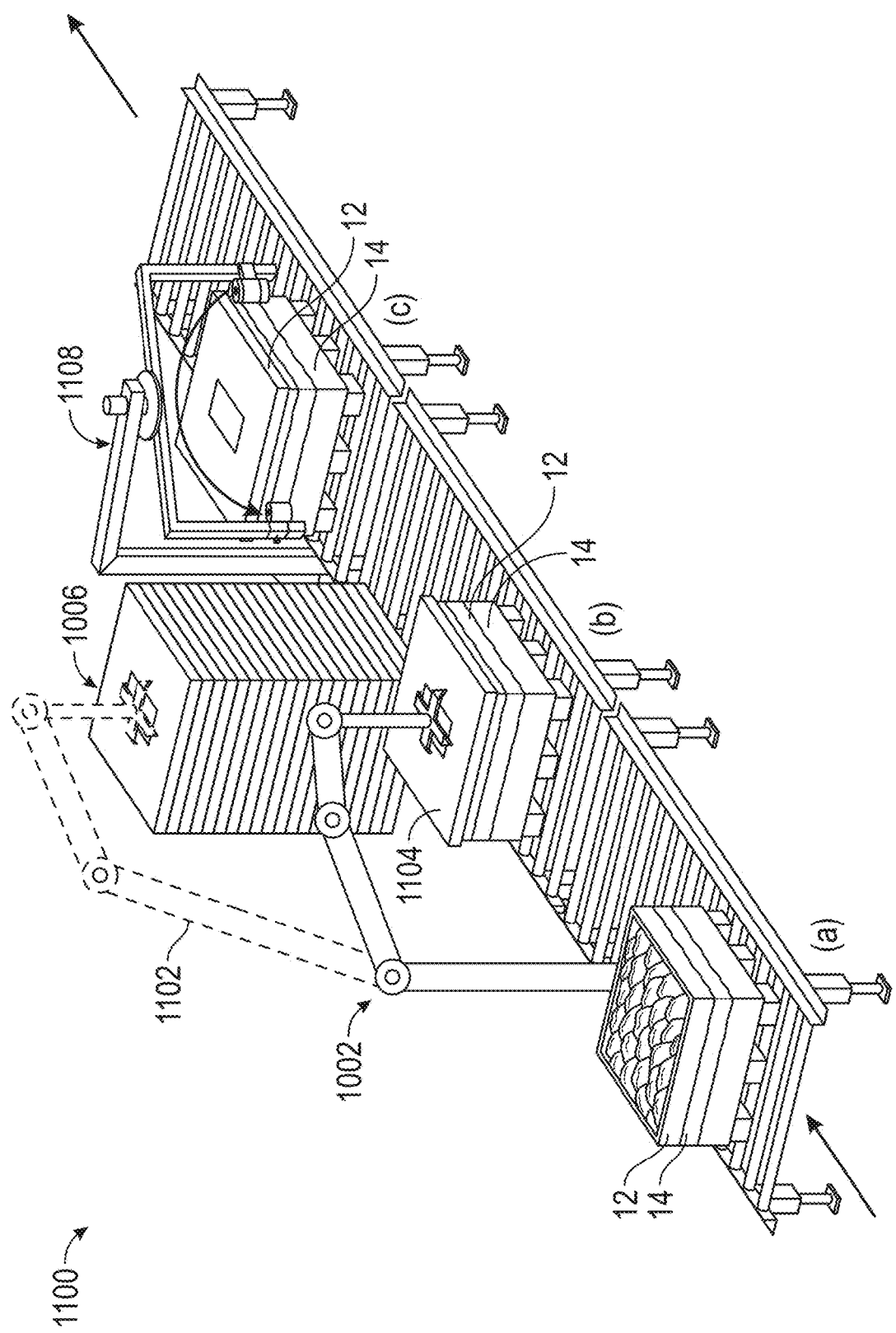
FIG. 11 illustrates a system having a conveyor with a bin, according to an embodiment of the present disclosure.

FIG. 11 shows a high speed conveyor process 1100 where the liner 12 is left pulled tight to the top of the bin 14 at stage (a). In stage (b), the apparatus 1102 places a protective cap or lid 1104 over the bin 14 from a stack of lids 1104 and then, at stage (c), uses a taper 1108 to seal the cap 1104 to the liner 12 and bin 14. In FIG. 11, the bin 14 is arriving from a vacuum cooling and nitrogen gas flush. The product is cooled and treated. The protective cap 1104 may be placed on top of the open liner 12. An automated rotating pressure taper 1108 or sealing device may be employed to seal the protective cap 1104 thereon. The tape may be applied with a rotating arm or ring wrapper or sealer and/or may be applied with the bin 14 on a turn table. Stage (a) may be after the vacuum and cooling and nitrogen gas flush stage. In stage (a), the produced has already been cooled and treated with cold nitrogen allowing a few minutes to seal in the low oxygen atmosphere. The cap 1104 may be a carboard or protective top cap.

The systems and methods herein describe a container, such as a bin, bulk bin, bulk container, etc., that has a liner therein. The liner may be a bag, a sheet, a flexible sheet, a thin sheet, a molded sleeve, etc., or combinations thereof. The liner may be formed of a thin, flexible material, plastic, biodegradable material, recyclable material, compostable material, etc., or combinations thereof. The liner may be received within the bin or container. A product, such as a perishable product, may be received within the liner. After the product is placed therein, the liner may be sealed and/or a modified atmosphere may be applied, as discussed herein. The bin or container may be located on a pallet and/or in a frame. FIGS. 12A to 22 illustrate exemplary bins, liners, and frames that may be employed with any or all of the methods and systems described herein.

FIGS. 12A to 12D shown an exemplary liner 1212. The liner 1212 may include a molded sleeve 1213. The liner 1212 may be a molded, semi-rigid sleeve. A semi-rigid sleeve may be a sleeve which maintains shape after forming. In the case of the liner 1212, the shape may generally conform to the interior of the bin in which the liner is placed (e.g., bin 14). Thus, once placed within the bin, the liner 1212 may maintain shape due to the semi-rigid nature of the sleeve. The liner 1212 may be hollow on the interior such that a product may be received therein. The liner 1212 may or may not include a bottom surface. The liner 1212 may include a lip 1214. The lip 1214 may extend outward from a top surface of the liner 1212. The lip 1214 may be configured to rest on an upper surface of the bin or container in which the liner 1212 is placed. The liner 1212 may be formed of a recyclable and/or compostable resin. A top 1216 may be placed on the top of the liner 1212 to cover the hollow interior. The top 1216 may be a top sheet, a lid, a vented-lid. The top 1216 may seal to the lip 1214.

Figure 12A:
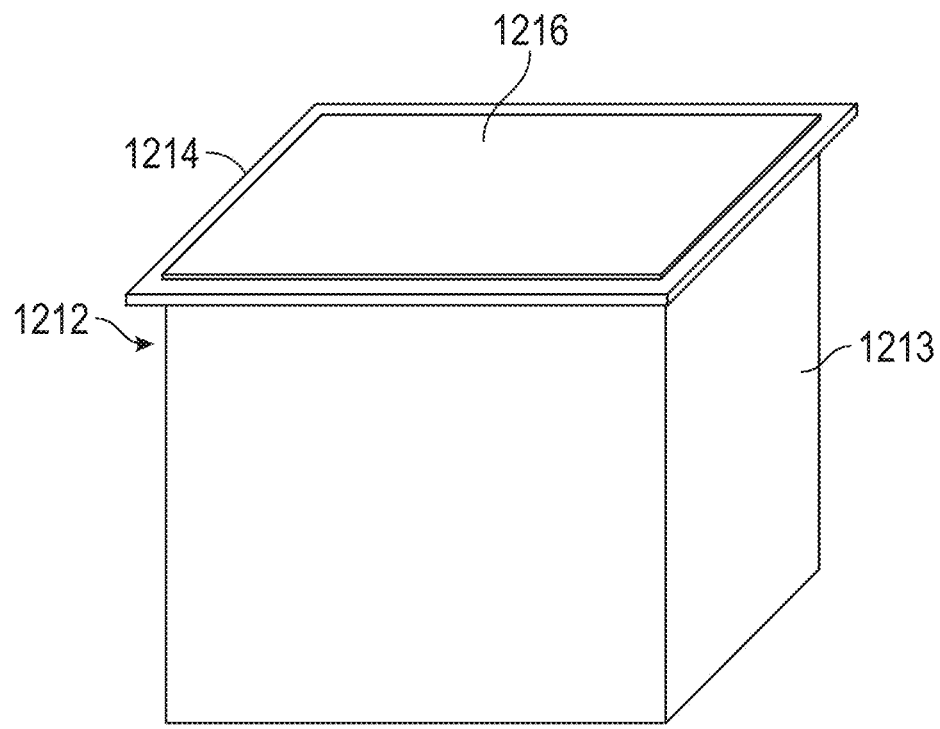
FIG. 12A illustrates a perspective view of a molded, semi-rigid sleeve with a top, according to an embodiment of the present disclosure.
Figure 12B:
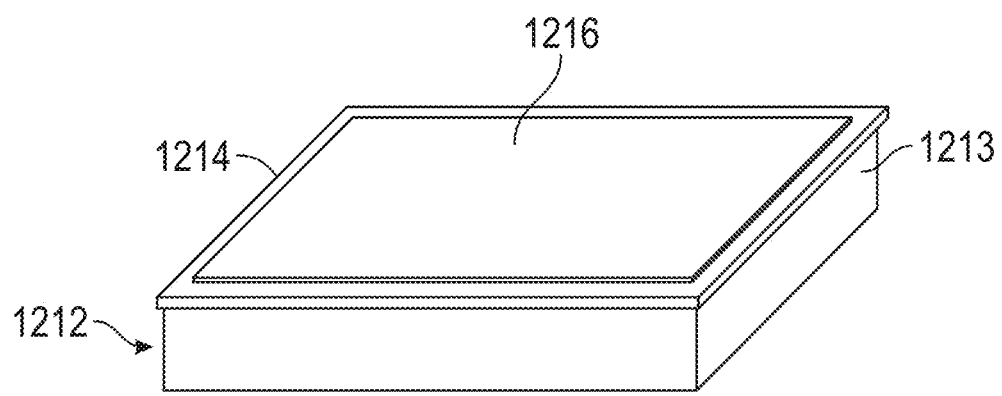
FIG. 12B illustrates a perspective view of the molded, semi-rigid sleeve with a top of FIG. 12A in a compressed state, according to an embodiment of the present disclosure.

With continued reference to FIGS. 12A to 12D, the liner 1212 may be nestable. That is, the liner 1212 may be configured to receive another liner and may be configured to be received by another liner. As shown in FIG. 12B, even though the liner 1212 semi-rigid, the liner 1212 may be configured to be folded or compressed into a more compact position for storage and or transportation. The liner 1212 may be formed of a material or may be structurally constructed to allow for the folding or compressing of the liner 1212. For example, the sides of the liner 1212 may be more flexible than other portions of the liner 1212 to allow for folding prior to use. The stackable/nestable liner 1212 and compressible liner 1212 may be the same or different liners. FIG. 12A illustrates how the liner 1212 of FIG. 12B appears in the expandable position. FIG. 12C illustrates different types of tops 1216 usable with the liner 1212.

Figure 12D:
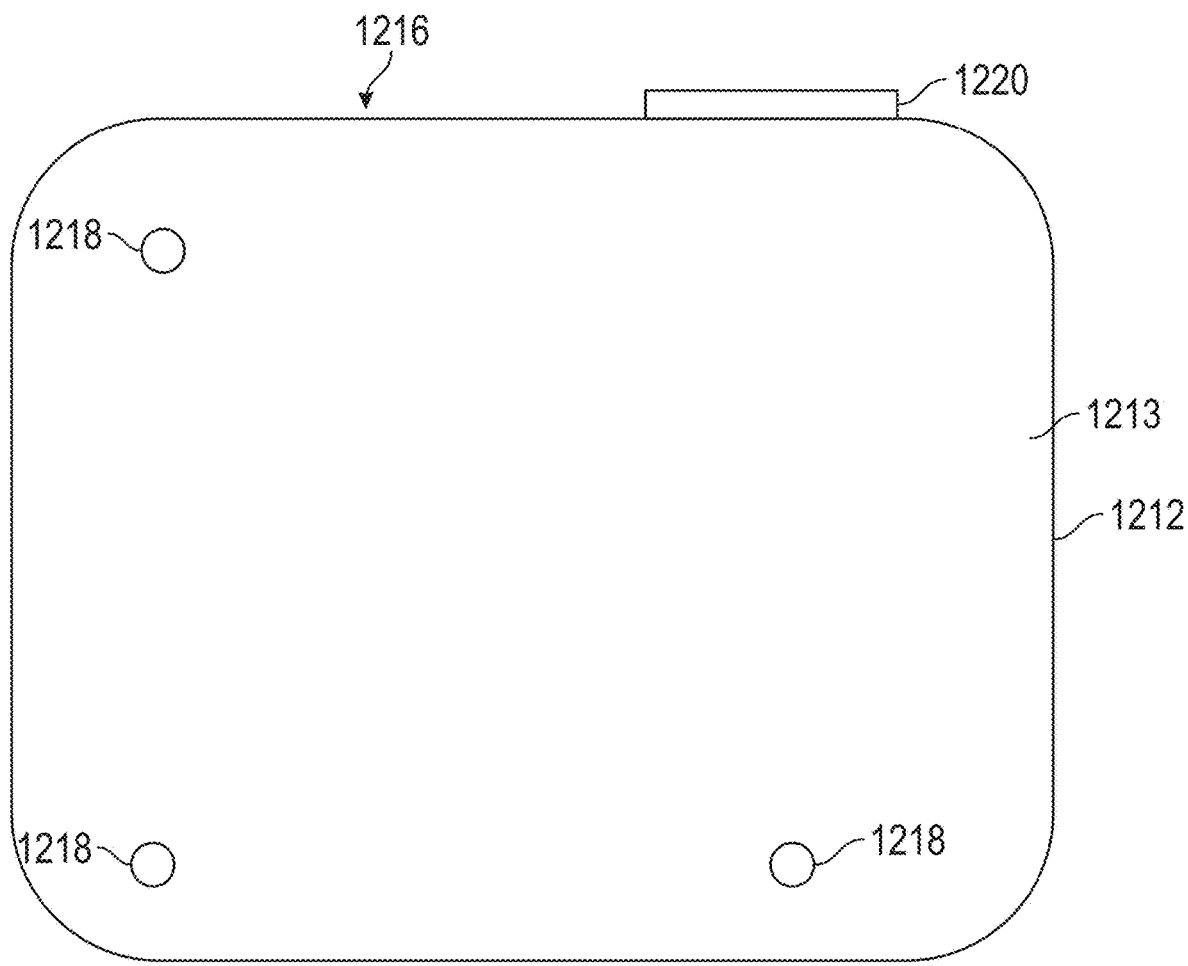
FIG. 12D illustrates a side view of the molded, semi-rigid sleeve with a top of FIG. 12A, according to an embodiment of the present disclosure.

FIG. 12D illustrates a side view of the molded, semi-rigid sleeve liner 1212 with the top 1216 sealed and/or secured therein. Within the liner 1212 and the top 1216 may be a sealed enclosure containing the product. In order to provide the sealed enclosure (e.g., the sealed interior of the liner 1212 and top 1216) with a modified atmosphere and/or substance and/or treatment, one or more ports 1218 may be provided in the side surface of the liner 1212. Alternatively, or additionally, the one or more ports 1218 may be formed in the top 1216. The one or more ports 1218 may be preformed in the liner 1212 such that they are provided at the time of manufacture of the liner 1212. Alternatively, or additionally, the one or more ports 1218 may be formed by piercing one or more nozzles into the liner 1212. The one or more ports 1218 may be sealable. That is, before, after, and/or during use, the ports 1218 may be sealed such that no fluid is permitted to enter or exit (except as provided through the nozzle inserted therethrough). In some examples, the top 1216 may include a sealable top feed and/or discharge opening 1220.

Figure 13A:
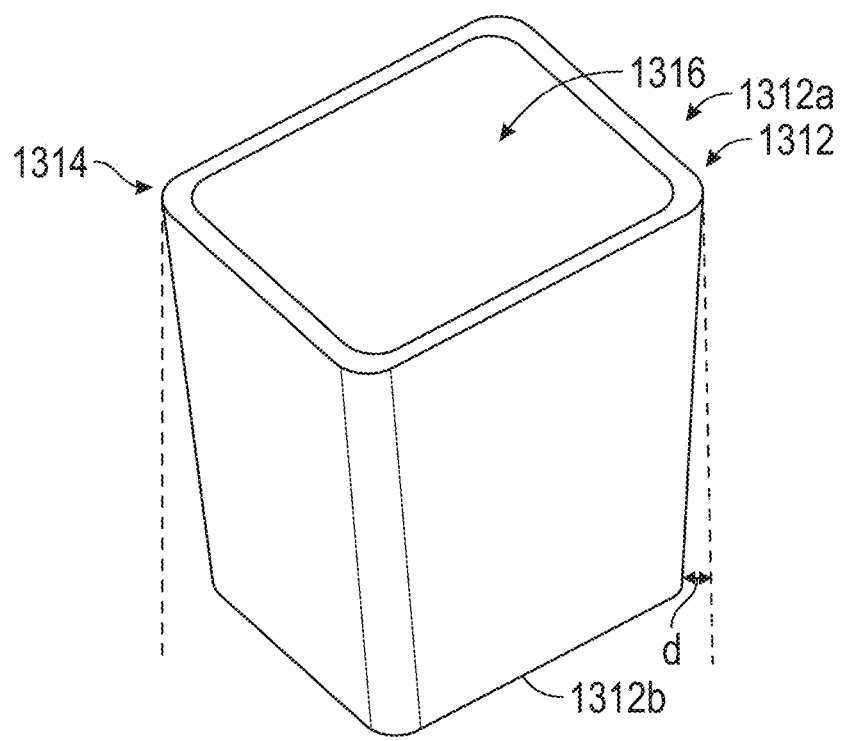
FIG. 13A illustrates a perspective view of a molded, semi-rigid sleeve with a top, according to an embodiment of the present disclosure.
Figure 13B:
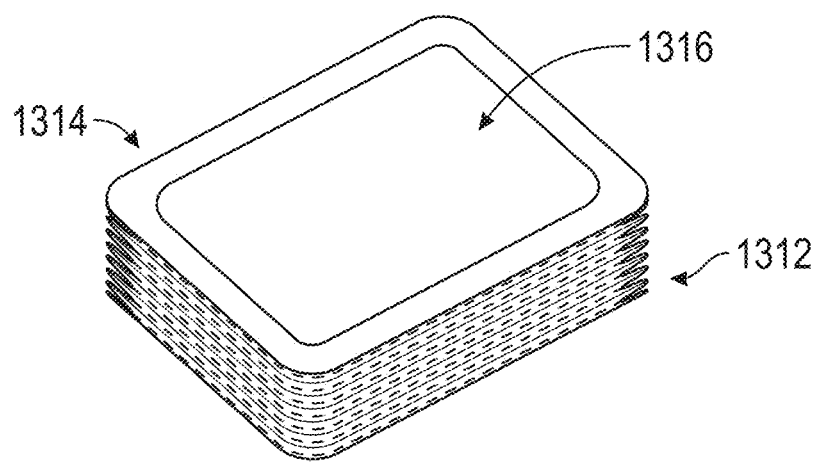
FIG. 13B illustrates a perspective view of the molded, semi-rigid sleeve with a top of FIG. 13A in a compressed state, according to an embodiment of the present disclosure.

FIGS. 13A and 13B illustrate a perspective view of a liner 1312. The liner 1312 may be a molded, semi-rigid sleeve with a top. The liner 1312 may be the same as, or similar to, the liner 1212 and may include any of the modifications described thereto. The liner 1312 may be tapered to allow for stacking or nesting with other liners 1312. That is, the outer perimeter may decrease at d from the top 1312a to the bottom 1312b of the liner 1312. The lip 1314 of the liner 1312 may allow for a clip-on top 1316 and/or sealable liner. In FIG. 13B, the liner 1312 is shown in a folded or compressed stated for empty shipment of the liner 1312 prior to loading with a product. In some examples, FIGS. 13A and 13B are the same liner 1312, such that the liner is both nestable and compressible. In some examples, FIGS. 13A and 13B are different liners, such that the liner is either nestable or compressible. In instances where the liner is compressible (either alone or in conjunction with nestable), the liner may appear as FIG. 13A before being compressed.

Although FIGS. 12A to 12D and 13A to 13B are described with respect to a liner, FIGS. 12A to 12D and 13A to 13B and their related descriptions may also apply to the bin. That is, the bin, such as, for example, bin 14, may tapered, such as shown in FIG. 13A, to allow for the bin to be stackable or nestable with other bins. The bin may alternatively, or additionally, be compressible, collapsible, or foldable, such as shown in FIG. 13B. In an example, the bin may be a molded sleeve such as shown and described in FIGS. 12A to 12D. In some examples, the compressible, collapsible, foldable, stackable, and/or nestable bin may be provided without a liner. That is, the liner may be omitted from the bin. In some examples, the bin may include a liner according to any embodiment disclosure herein. In some examples, the liner may be a thin throw away liner. In some examples, the lids and/or caps of the bins may be stackable or collapsible.

Any of the foldable, compressible, collapsible, stackable, or nestable lids, bins, or liners may be provided in any of the methods described herein (e.g., FIGS. 1 to 11). By providing a foldable, compressible, collapsible, stackable, nestable, or combinations thereof, lid, bin or liner, or combination thereof, the systems and methods of the present disclosure allow for the bins, lids, liners, or combinations thereof, to be reused a plurality of times. That is, once the product is empty, the bins, lids, and liners may be stacked or collapsed for return to the source to be loaded with product again. This cycle may continue a plurality of times.

Figure 14A:
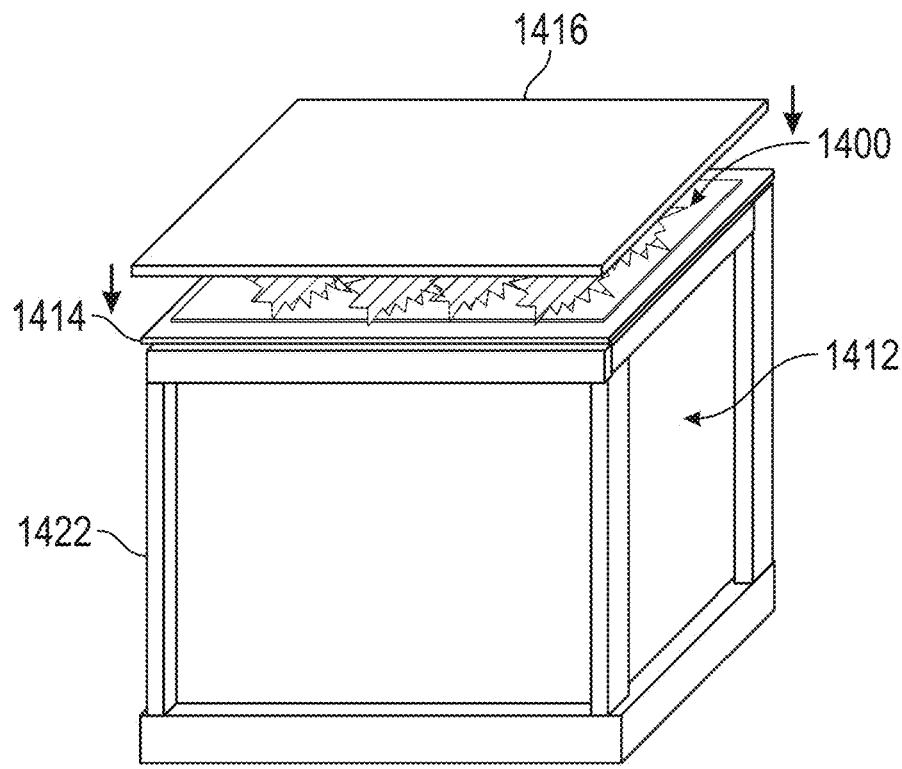
FIG. 14A illustrates a perspective view of a sleeve within a frame, according to an embodiment of the present disclosure.
Figure 14B:
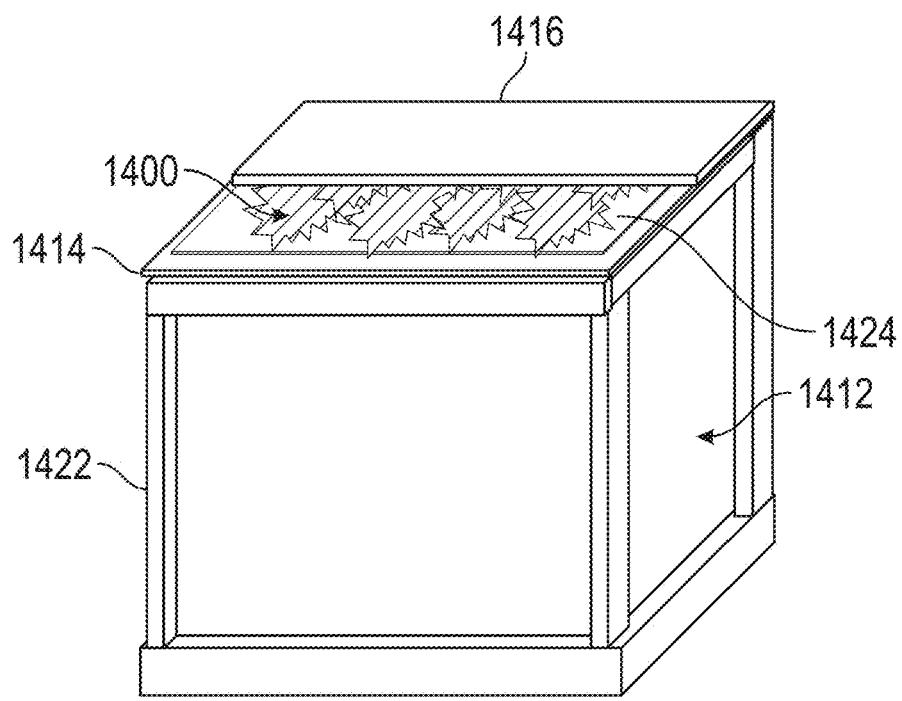
FIG. 14B illustrates a perspective view of a sleeve within a frame, according to an embodiment of the present disclosure.

FIGS. 14A and 14B illustrate a liner 1412 in a frame 1422. The frame 1422 may form the bin (e.g., bin 14) for the liner 1412. The liner 1412 may be any of the liners disclosed herein. A top 1416, such as a lid, may be sealed to the liner 1412. The top 1416 may be sealed to a lip 1414 as previously described herein. The product 1400 may be located in a hollow interior of the liner 1412. The product 1400 may be sealed within the liner 1412 and the top 1416, in any of the aforementioned processes. The frame 1422 may provide structural support to the liner 1412 and/or may provide support for stacking with other filled liners 1412. In FIG. 14A, the top 1416 may be a solid lid with no openings or perforations therethrough and/or with any openings or perforations sealed. In FIG. 14B, the top 1416 may have a window 1424. The window 1424 may be a portion of the top 1416 that is not sealed, has perforations, or is otherwise open to allow for cooling and $N_2$ flushing, and/or modification of the atmosphere around the product 1400 with a substance or treatment. The window 1424 may be sealed after treatment.

FIGS. 15 to 20 illustrate frames according to the present disclosure. The frames of FIGS. 15 to 20 may form the bins or containers of the present disclosure (e.g., the bins 14). The frames of FIGS. 15 to 20 may be used within any of the systems, methods, liners, nozzles, tops, etc., as described herein.

Figure 15:
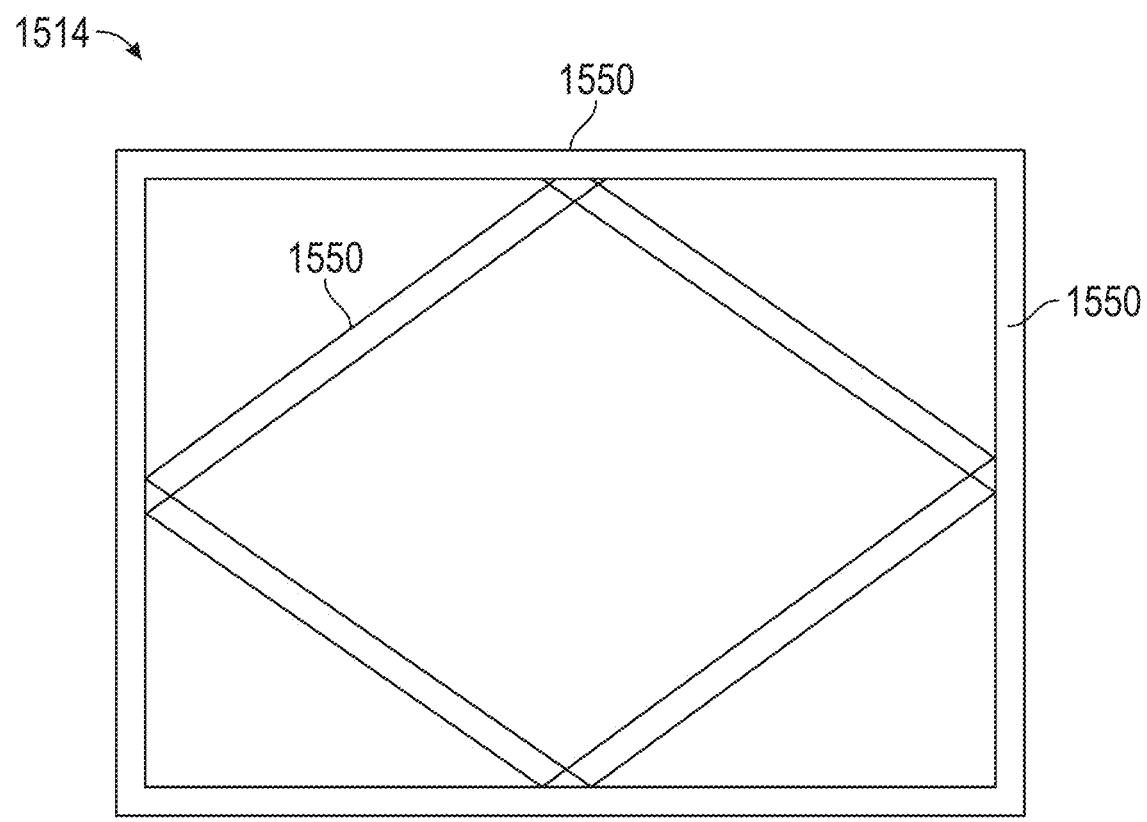
FIG. 15 illustrates a side view of a frame, according to an embodiment of the present disclosure.

FIG. 15 illustrates a side view of a frame 1514. The frame 1514 may be formed of members 1550. The outer members 1550 may form a structurally supporting shape to support a liner and product therein. The diagonal members 1550 may allow for compressing of the frame 1514. This may allow for the frame to be compressed or folded when not in use. The members 1550 may be formed of sustainable materials, recyclable materials, compostable materials, etc., or combinations thereof.

Figure 16A:
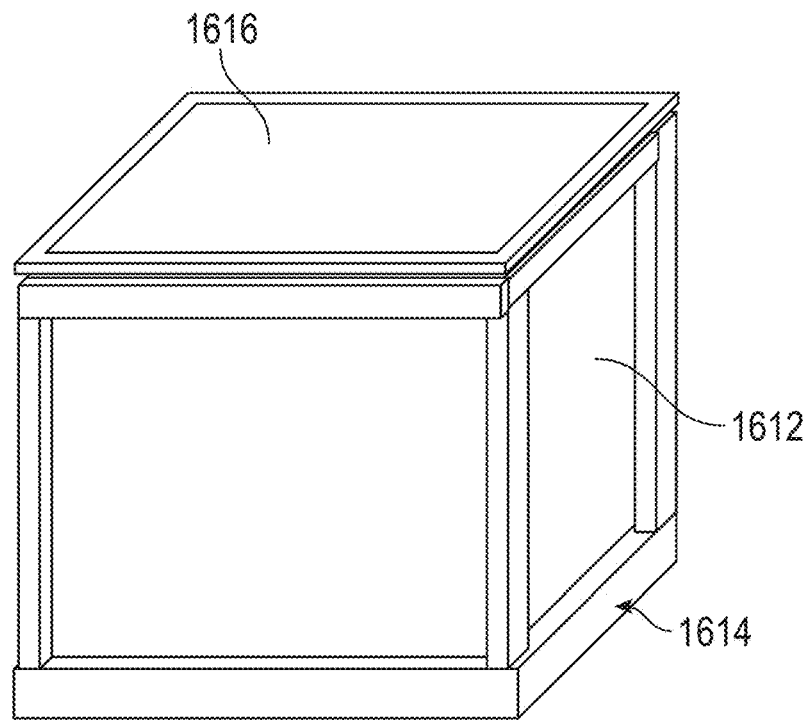
FIG. 16A illustrates a perspective view of a sleeve within a frame, according to an embodiment of the present disclosure.
Figure 16B:
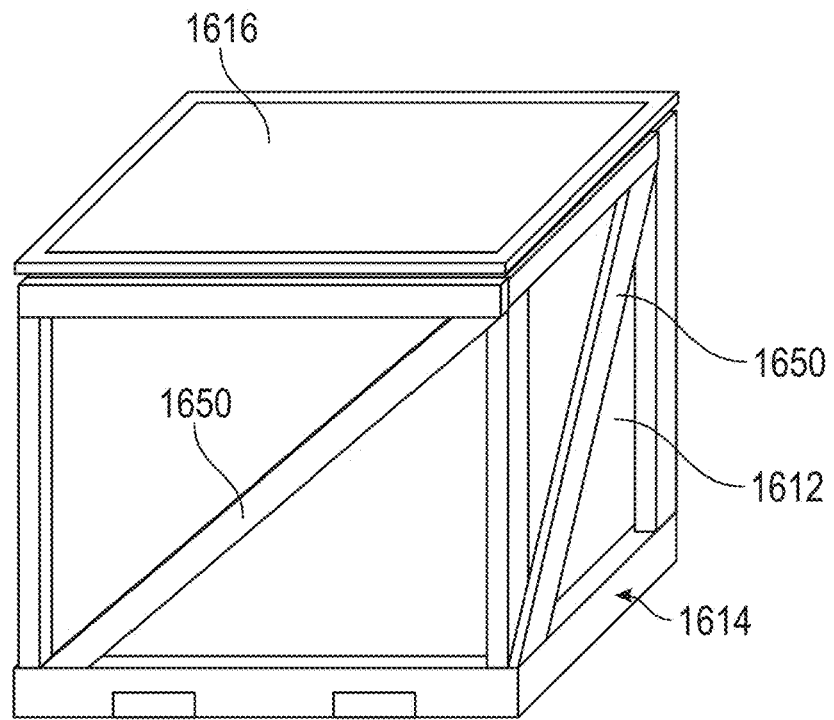
FIG. 16B illustrates a perspective view of a sleeve within a frame, according to an embodiment of the present disclosure.

FIGS. 16A and 16B illustrate perspective views of a frame 1614. A liner 1612, such as any liner described herein, may be placed within the frame 1614. A top 1616 may be sealed to the liner 1612 to form a sealed enclosure therein. In FIG. 16A, the frame 1614 may be a collapsible frame and may support the liner 1612. The frame 1614 may be collapsed with the liner 1612 in place or before the liner 1612 is installed. In FIG. 16B, side brace members 1650 may be added to maintain the frame 1614 in the expanded position. The members 1650 may assist in supporting the liner 1612. The members 1650 may be removed when collapsing the frame 1614, with or without the liner 1612 therein.

Figure 17:
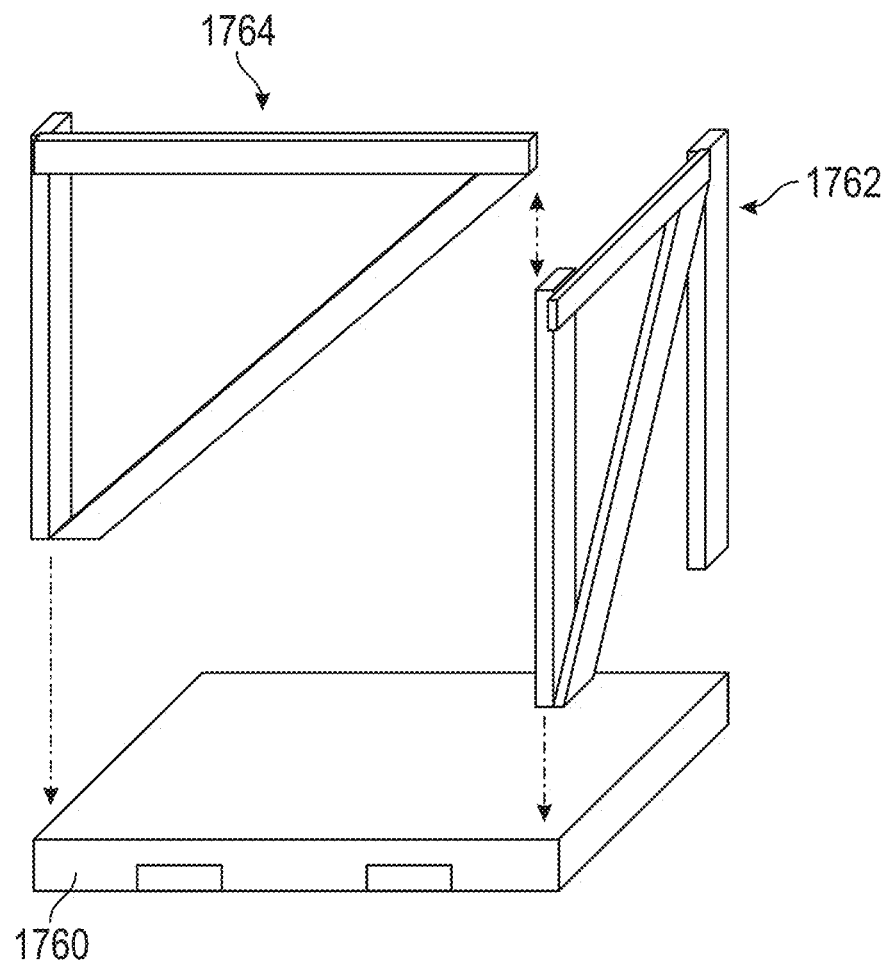
FIG. 17 illustrates an exploded perspective view of a frame, according to an embodiment of the present disclosure.

FIG. 17 illustrates an exploded perspective view of a frame 1714. The frame 1714 may include a base 1760, a side frame 1762, and a corner frame 1764. The base 1760 may be a pallet. Although one of each of the side frame 1762 and corner frame 1764 are shown, it may be appreciated that a second is present to complete the perimeter of the base 1760. The frame 1714 may support a liner as described herein. The frame 1714 may or may not be collapsible.

Figure 18:
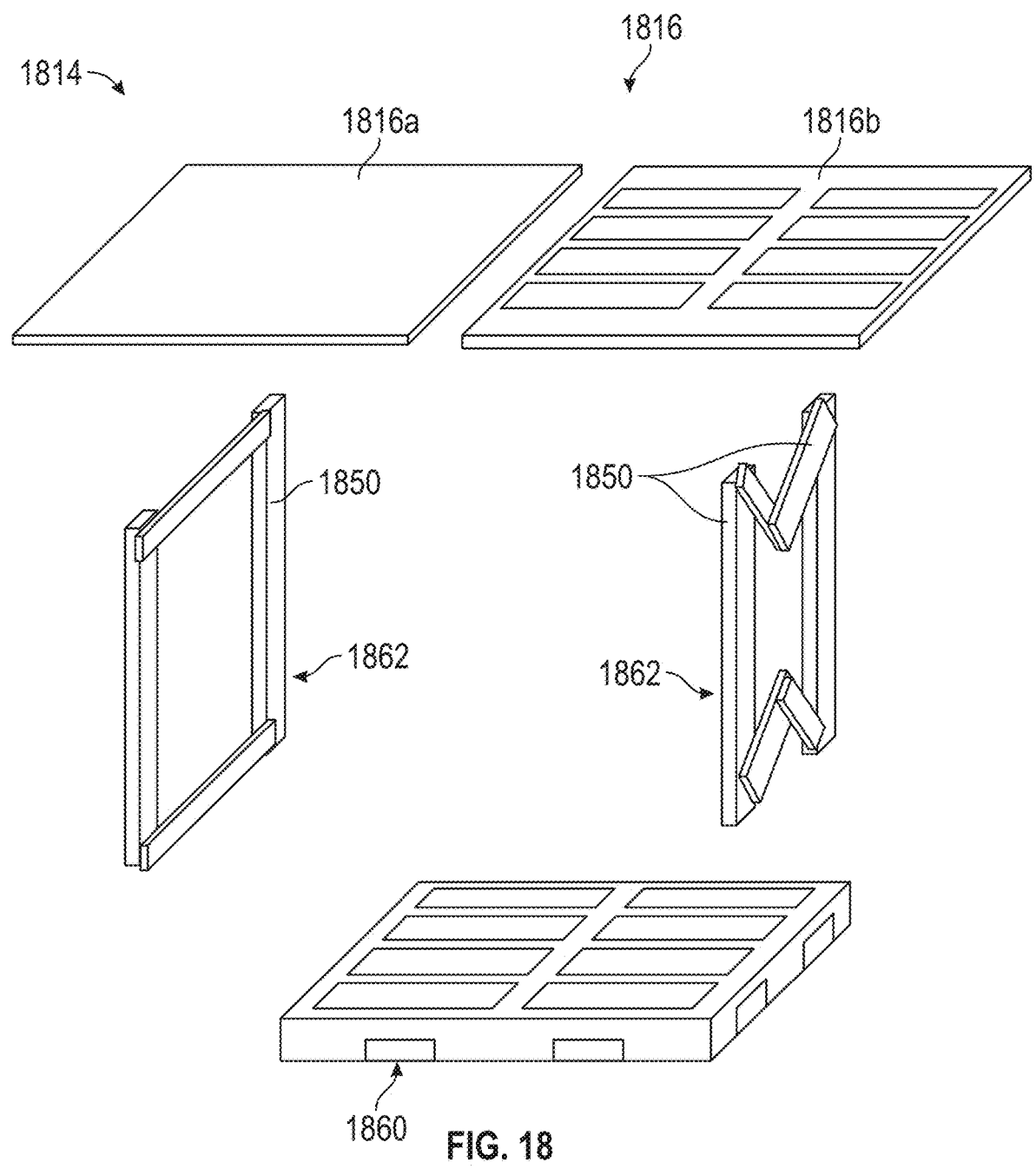
FIG. 18 illustrates an exploded perspective view of a frame, according to an embodiment of the present disclosure.
Figure 20:
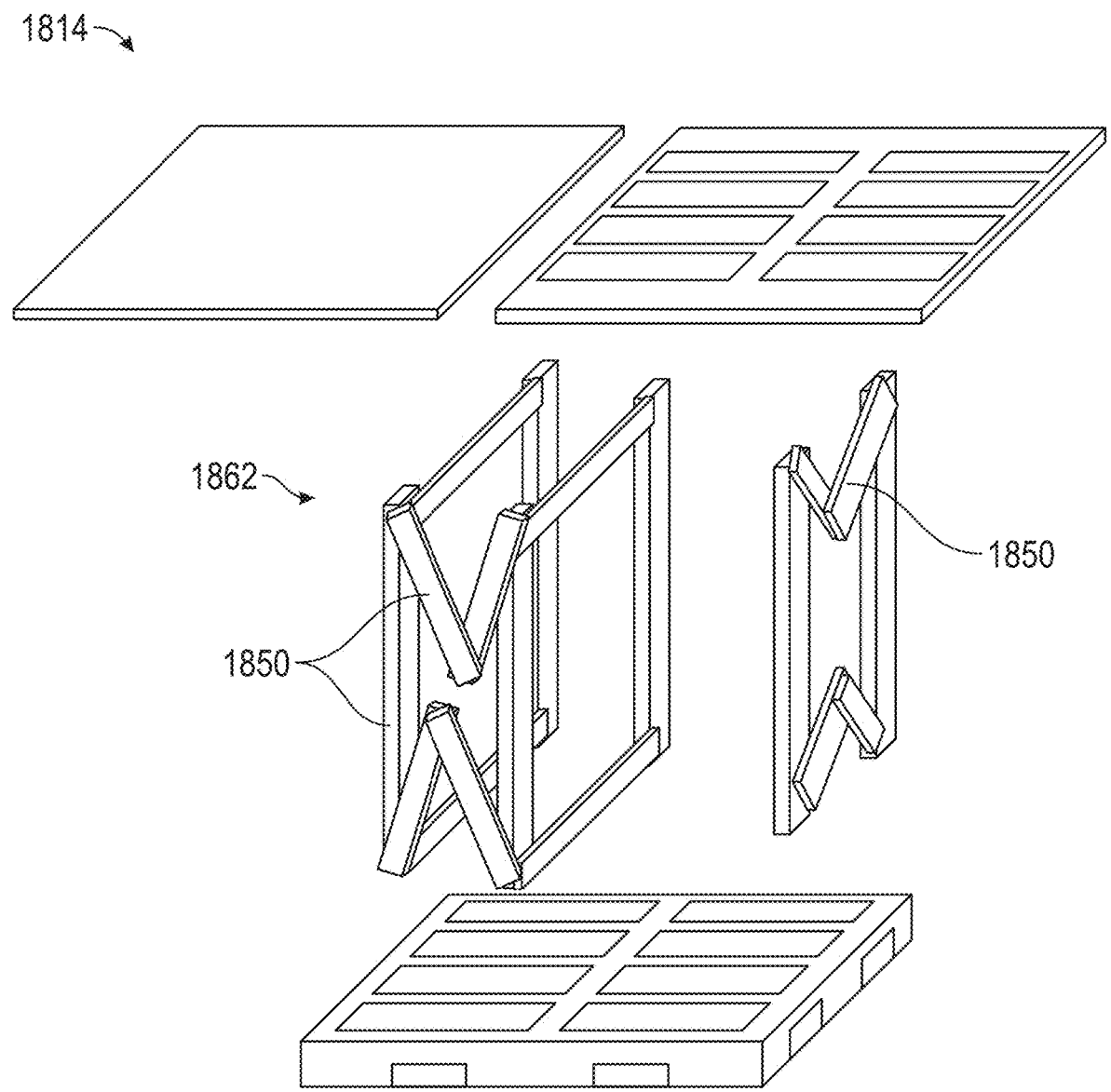
FIG. 20 illustrates an exploded perspective view of a frame, according to an embodiment of the present disclosure.

FIGS. 18 and 20 illustrate an exploded perspective view of a frame 1814. The frame 1814 has a base 1860. The base 1860 may be a pallet. The frame 1814 may include side frames 1862. The side frames 1862 may be formed of one or more members 1850. One or more of the members 1850 may be collapsible (either by construction or material). For example, the members 1850 may be formed of a material configured to allow folding. For example, the members 1850 may be hinged to adjacent members 1850 to allow relative motion therebetween. The frame 1860 may include a top 1816. The top 1816 may be a solid top 1816a or a vented top 1816b. The top 1816 may fit over the outer surfaces of the side frames 1862 when the frame 1814 is assembled. The frame 1814 may or may not be collapsible. The frame 1814 may support a liner as described herein. As shown in FIG. 20, the frames 1862 may be collapsible in two dimensions, both vertically and horizontally. This may allow for the frame to be collapsed vertically and horizontally.

Figure 19:
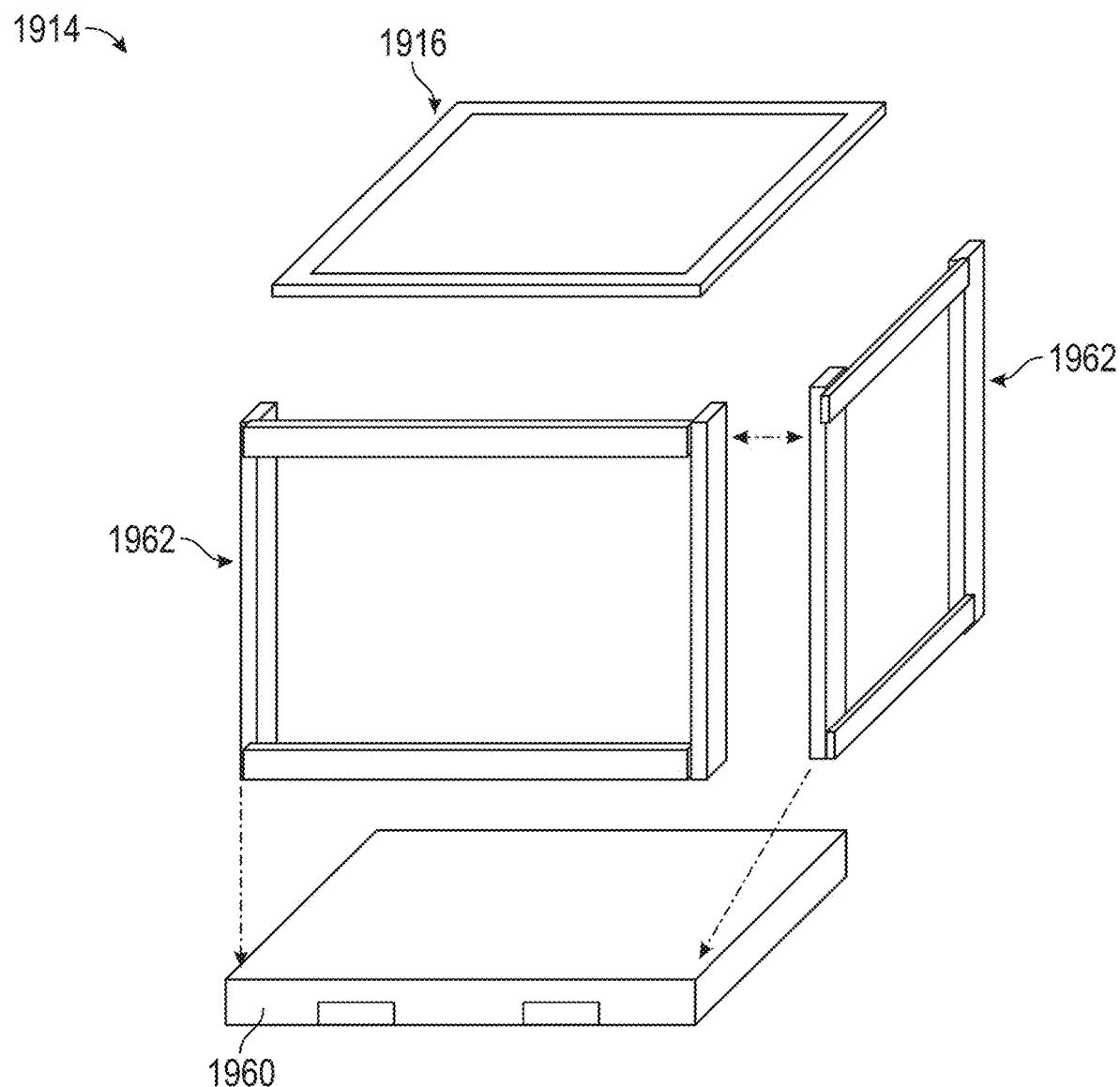
FIG. 19 illustrates an exploded perspective view of a frame, according to an embodiment of the present disclosure.

FIG. 19 illustrates an exploded perspective view of a frame 1914. The frame 1914 may include a base 1960 and one or more side frames 1962. The base 1960 may be a pallet. The side frames 1762 may connect to the base 1960 and to adjacent side frames 1762. The frame 1914 may include a top 1916. The top 1916 may be vented, open, or solid. The top 1916 may fit over the outer surfaces of the side frames 1962 when the frame 1914 is assemble. The frame 1914 may or may not be collapsible. The frame 1914 may support a liner as described herein. The frame 1914 may be plastic or hardwood.

Figure 21:
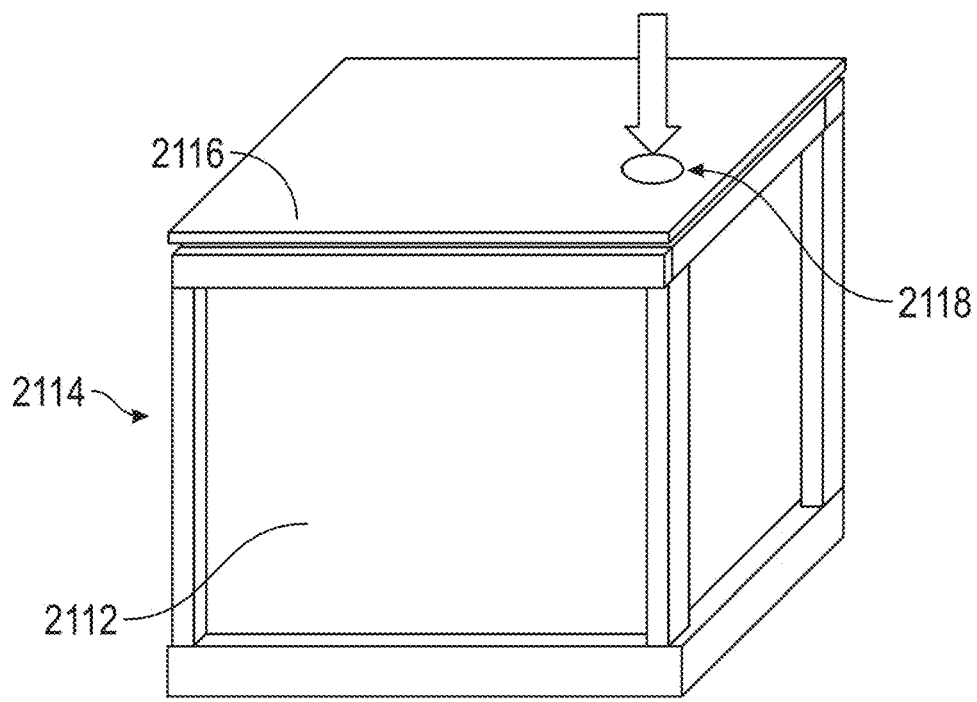
FIG. 21 illustrates a bin with injection of a modified atmosphere, according to an embodiment of the present disclosure.
Figure 22:
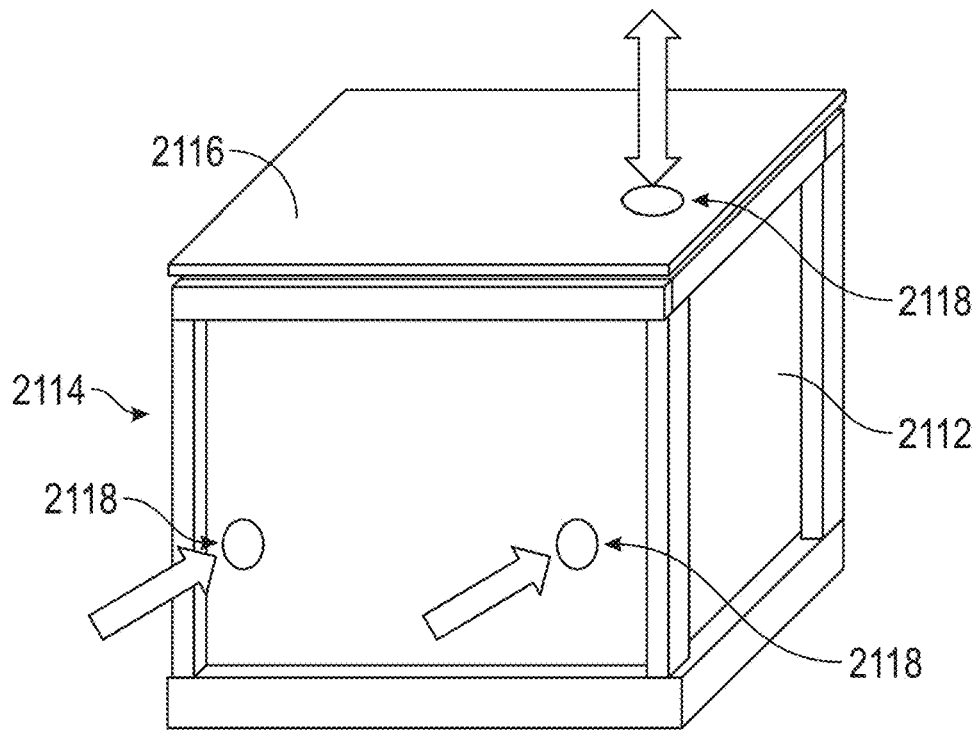
FIG. 22 illustrates a bin with injection of a modified atmosphere, according to an embodiment of the present disclosure.

FIGS. 21 and 22 illustrate a frame or bin 2114 having a liner 2112 therein. In FIGS. 21 and 22, injection of a modified atmosphere and/or functional substance may be provided through one or more ports 2118. As mentioned, the ports 2118 may be preformed during manufacturing of the top 2116 and/or may be pierced at the time of injection by a nozzle. The ports 2118 may be sealed before and after injection of the modified atmosphere and/or functional substance.

Figure 23:
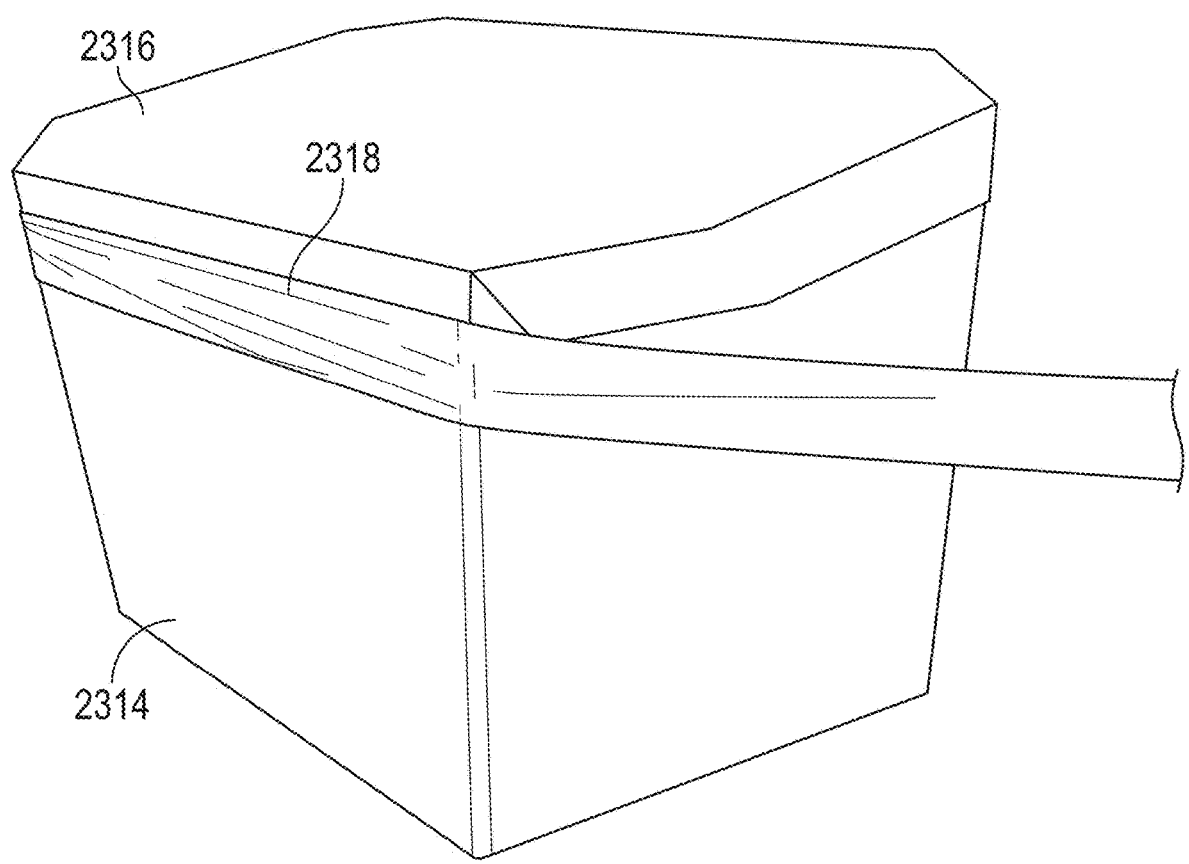
FIG. 23 illustrates a bin with a cap, according to an embodiment of the present disclosure.

As described herein, and referring to FIG. 23, a bin 2314 may include a top cap 2316 that is sealed to the bin 2314 with tape 2318. The tape 2318 may be applied with a tape roller (not visible). The bin 2314 may be a low cost, foldable, reusable plastic bin with top cap. Although not shown, a bottom cap may also be included. The bin is sealed or taped to create the air tight enclosure for holding a modified atmosphere & prescribed product environment, along with prescribed product specific substance treatments. Thus, the bin 2314 may or may not include a liner therein.

In FIG. 23, the process to seal the top cap 2316 to the bin 2314 includes a pressure pad or roller to follow the tape applicator to press down the tape 2318 and get a good seal as described herein. The process can be automated as also described herein. In some examples, the top cap can be sealed to the bin/box/pallet. Where a bottom cap is included, it may be sealed to the bin 2314 in the same manner as the top cap 2316. In some examples, both the top cap and bottom cap are included. In some examples, the bin 2316 may have a full (e.g., solid) or half (e.g., partially open or vented) size top cap 2316. This top cap 2316 may overlap all or part of the bin 2314 prior to sealing or taping. The top cap 2316 could be a telescoping two piece bin top & bin bottom sealed at the overlap point.

The systems and methods of the present disclosure thus allow for the sealing of a liner bag within a bin to create a sealed enclosure around a perishable product therein. A modified atmosphere may be applied to the sealed enclosure. The systems and methods of the present disclosure may provide for re-sealing the liner bag after treatment or application of a substance and/or application of the modified atmosphere within the sealed enclosure. Accordingly, it may be appreciated that any of the systems, methods, process steps, apparatus, components, including, but not limited to, liners, frames, bins, tops, injection systems, sealing systems, sealing devices, etc., may be included in any of the systems, methods, or apparatus described herein to achieve a modified atmosphere within a sealed enclosure of a liner in a bin.

Any of the features of the configurations, embodiments, or examples of liners, bins, and lids may be applied to any of the other configurations, embodiments, or examples of liners, bins, and lids described herein. For example, any of the lids, bins, and liners may be stackable, nestable, compressible, or the like. For example, any materials may be interchanged between embodiments.

A substantial amount of perishable fruit and vegetables are harvested and packed within bulk containers for further handling or processing at facilities such as fresh-cut processing centers. Many of these facilities are located regionally to be able to provide the freshest pre-cut product to their customers. The products are shipped over several days to weeks in the bulk form to the regional centers so that the distance and time after final processing can be as short as possible for maximum remaining shelf life in the final supply chain to the consumer. Example products are iceberg lettuce used for chopped salads and shredded lettuce for sandwiches. Also, green cabbage used for coleslaw and salad mixes. Other perishables include pre-peeled carrots and pre-peeled onions. Millions of bins of these type of products which can weigh up to 800 lbs./bin are produced each year. To support the scale of this supply chain, appropriate technology and process quality control must be present to protect and preserve the perishable products. Failure to accomplish that places a great burden on the processing facility. It must have processing lines and hire labor to physically trim away defects and discoloration that occurs during the transit. The additional detrimental effects of this are that the process line product rate is reduced, and yield is substantially lower. For example, to cut away the visible defects includes cutting away a large portion of the good product area. This with the labor results in a higher product cost. And then just as importantly, product quality and shelf life are impacted. Of course, not all the physical defects can be effectively removed, which could lead to product rejection, credits, and claims down the supply chain to the customer. And the product will have lost freshness that cannot be recovered once chopped and repackaged. So, production capacity and cost, and then physical defects impacting product appearance, and lost shelf life which impacts freshness, taste, and usability are critical barriers to commercial success.

The technology needed to ensure commercial success is clear. Certain standard operating procedures have been in place for a number of years to produce acceptable product through this supply chain. And yet the current methods and apparatuses in place have some limitations, are vulnerable to process variation, high material and labor costs, and some risks in use at the regional processing centers. The focus of the present invention is on the part of the supply chain that occurs specifically immediately after harvest at the cooling centers. The invention proposes alternative methods that include bin design, addition of sanitation within the cooling step, alternative bin sealing, alternative nitrogen infusion, and addition of sanitation and functional substances within the bins. Important elements of the improved system-process provide for prescribed combinations of these methods to accomplish the outcome of better product quality, shelf-life, safety, and value.

The modified atmosphere, substance, treatment substance, functional substance, functional treatment, and/or treatments described herein may be any number of substances. For example, the substances may include compressed filtered, dry, or humidified air, an industrial gas including but not limited to nitrogen, carbon dioxide, and oxygen, & carbon monoxide. The targeted functional substances (including any sanitizers and allowable substances for treatment of the product) are mixed into the injected gas and may include: chlorine dioxide, hydrogen peroxide, peracetic acid, ozone, ionized air or industrial gas, ionized sanitizer or water, pH adjusted water or sanitizer, limonene, lemon oil, orange oil, grapefruit oil, rosemary oil, thyme oil, sunflower oil, other fruit-derived oils, tea tree oil, cinnamon oil, eucalyptus oil, potassium oleate, sodium dodecyl sulfate (SDS), ascorbic acid, citric acid, sodium bicarbonate, potassium carbonate, calcium phosphate, linear terpenes, cyclic terpenes, alcohols, aldehydes, esters, ketones, lactones, thiols, lipase, rose oil, rose essence, and fruit essence, vitamins, minerals, flavonoids, flavor compounds, color compounds, essence, essential oil, sugar, THC or THC compounds, CBD or CBD compounds, probiotics, phages, enzymes, pharmaceutical compounds, biological compounds, or ripening management or conditioning agents such as ethylene or ethephon. The modified environment may include powders, nano-particles, fluidized and/or gaseous state materials. The modified environment may include substances injected in the form of a vapor, mist, or gaseous (invisible or cloud like) state. Any combination of the aforementioned functional substances may be provided As part of the process to vacuum cool the bins, nitrogen is frequently added to the vacuum tube just prior to opening. The atmosphere in the bins leaving the cooling tube is then mostly nitrogen. The bins must be sealed reasonably quickly to retain the nitrogen essential for a low oxygen modified atmosphere. The amount of nitrogen used to fill the vacuum tube is much in excess (two to five times) of the amount needed just to fill the bins due to the vacant unused space within the tube. And then there is the escaping nitrogen before sealing to consider. This of course could be highly variable from day to day or bin to bin. The use of double stacked bins helps the nitrogen usage efficiency with this process, but unstacking bins adds to the time it takes to reseal. So, there can be some advantages to add the nitrogen to the bins after the bins are sealed. A vacuum can first be pulled on a sealed bin and the fill amount added. While adding the nitrogen to the sealed bin, sanitizers included but not limited to ozone, and other functional substances can be added separately or mixed with the nitrogen to achieve a preferred overall atmosphere to protect, preserve, and enhance the perishable product.

Eliminating the practice of only creating a small opening in the bin liner through the partially closed zip tie, the time to cool the product and by extension the cost of cooling will be substantially reduced.

To add the nitrogen, the invention envisions the use of one or more nozzles that would first pierce the sealed liner or top sheet. Applying vacuum and/or controlled venting to remove oxygen and then replacing with nitrogen achieves the modified atmosphere. The apparatus with inline or remote sensors and controllers can determine proper sequence of vacuum, -controlled venting, and nitrogen infusion as well as flow rate, metering and addition times. The methods and apparatus can include devices and components to prevent or capture any leakage of sensitive gasses or substances. With this overall system including sensors, a more transparent quality control system would be in place to insure consistency in the modified atmosphere application. Then automatic tapers would seal off the locations that had been penetrated.

So the operational, commercial, and quality benefits for applying the elements of the invention would include: reduced labor cost, faster cooling time and lower cooling cost, reduced nitrogen usage and costs, elimination of the cost of the long zip tie, reduced space usage at cooling center, more consistent application of modified atmosphere, addition of beneficial substances such as sanitizers, improvement in bin dumping process at the regional centers, and reduced risk of foreign material contamination. In addition, there is an opportunity to save on freight costs from the source locations to the processing facilities while also reducing waste, improving recycling and reuse of bins, liners, pallets or slip-sheets, and lidding-sealing materials.

It will be recognized by one experienced in the art that the disclosed system, methods, and apparatus for creating a sealed bin enclosure, a modified atmosphere, and substance treatments can be engineered and adopted to provide a better outcome for other perishable products.

Further aspects of the present disclosure may be appreciated from the following clauses.

In aspect of the present disclosure, a method for sealing one or more containers comprises placing the one or more containers having a liner therein on a moving conveyor; moving the one or more containers with the conveyor; opening the liner; collecting the liner with clips, a grab and pinch device, robotic arms, robotic fingers, or combinations thereof, wherein the collecting occurs in tandem with the one or more bins moving along the conveyor; pulling together open edges of the liner; and sealing the liner together with a heated band sealer, a wide or double seal impulse sealer, a heat sealer, a sealer, or combinations thereof, wherein the sealing occurs in tandem with the one or more containers moving along the conveyor, wherein the one or more containers contain perishable product.

In an aspect of the present disclosure, a method for sealing a perishable product in a bin includes placing the bin having a liner therein on a moving conveyor; moving the bin with the conveyor; opening the liner; collecting the liner with clips, a capture-grab and pinch device, robotic arms, robotic fingers, or combinations thereof, wherein the collecting occurs in tandem with the one or more bins moving along the conveyor; pulling together open edges of the liner and twisting and looping the edges of the liner together; and sealing the twisted and looped edges of the liner together with a taper, zip tie devise, heat seal, or combinations thereof, at the twisted and looped location.

In an aspect of the present disclosure, a method for sealing a perishable product in a bin includes placing the bin having a liner therein on a moving conveyor; moving the bin with the conveyor; opening the liner; placing a top sheet over an open top of the liner and the bin and holding the top sheet in place; pushing along one or more edges of the top sheet with mechanical brushes or fingers; and sealing the top sheet to the bin and the liner using a taper device, wherein the taper device rotates around the bin or wherein the bin is on a turntable.

In an aspect of the present disclosure, a method for sealing a perishable product in a bin includes molding a bin liner to form a molded bin liner, wherein the molded bin liner is a semi-rigid sleeve; placing the molded bin liner in the bin, wherein the bin is a weight supporting bin; and fitting a lid over the molded bin liner and the bin, wherein the lid clicks and seals to the molded bin liner.

In an aspect of the present disclosure, a method for sealing a perishable product including providing a weight supporting bin containing the perishable product; sealing the weight supporting bin with a fitted lid; providing nitrogen and/or other gasses to the bin creating a modified atmosphere within the weight supporting bin after sealing the weight supporting bin; adding other functional substances along with the modified atmosphere into the sealed weight supporting bin; and resealing the weight supporting bin, in conjunction with or immediately after the modified atmosphere is created.

The method of any preceding clause, wherein the one or more containers is a bin or a large bulk product packaging container.

The method of any preceding clause, wherein the liner is a bag liner.

The method of any preceding clause, wherein the liner forms a sealed enclosure therein.

The method of any preceding clause, wherein the one or more containers is cooled prior to sealing.

The method of any preceding clause, further comprising cooling the one or more containers and infusing an interior of each of the one or more containers with nitrogen prior to sealing, and wherein a sanitizer and/or substance treatment is added to the interior of each of the one or more containers during or at the end of the cooling.

The method of any preceding clause, wherein the cooling is vacuum cooling.

The method of any preceding clause, further including piercing the liner with one or more nozzles, and adding vacuum, controlled venting, nitrogen (industrial gas or air), sanitizer, functional substances, or combinations thereof to an interior or the liner prior to removing the one or more nozzles from the liner; removing the one or more nozzles from the liner; and sealing a location where the one or more nozzles pierced the liner.

The method of any preceding clause, further including heat sealing the lid to the molded bin liner.

The method of any preceding clause, further including cooling the bin.

The method of any preceding clause, further including applying a top to the bin prior to the cooling, wherein the top includes perforations that are open prior to cooling; and closing the perforations after cooling and infusion of an interior of the bin with nitrogen, industrial gas, and/or a functional substance treatment.

The method of any preceding clause, wherein the top is a top sheet, a vented lid cap, a lid cap, or a lid.

The method of any preceding clause, wherein closing the perforations includes taping the perforations, moving a lid cover over the perforations to seal the perforations, sealing the perforations, replacing the top with a non-vented lid, or combinations thereof.

The method of any preceding clause, wherein the top is applied to the bin prior to the cooling and wherein the top includes perforations or is a vented lid-cap that are open prior to cooling and are then tape sealed closed, a cover is applied only to the vented portion of the lid, or replaced with a non-vented lid which is sealed after cooling and infusion with nitrogen.

The method of any preceding clause, further comprising cooling the weight supporting bin.

The method of any preceding clause, further comprising applying a top sheet to the bin, wherein the fitted lid is applied to the weight supporting bin prior to the cooling and wherein the top sheet has perforations that are open prior to cooling and are then tape sealed closed after cooling and infusion with a substance treatment.

The method of any preceding clause, further comprising an apparatus for de-cuffing a plastic bin liner bag from bin and elevate the bin liner bag up vertically, straighten and stretch it taut.

The method of any preceding clause, further comprising an apparatus designed to capture the elevated bin liner bag and hold in place while the bin is moving along a conveyor between stages.

The method of any preceding clause, further comprising an apparatus de-cuffing, elevating, straightening and stretching or holding the liner bag may include one or more nozzle-fingers for vacuuming or adding industrial gas or applying substance treatments inside of the bin liner bag during conveyance, prior to, and/or in conjunction with the sealing.

The method of any preceding clause, wherein the sealing further comprises an apparatus for band heat sealing or impulse heat sealing the liner to complete the seal.

The method of any preceding clause, further comprising an apparatus configured to apply a top sheet over the bin and a pulled open bin liner bag within the bin.

The method of any preceding clause, wherein the sealing further comprises an apparatus configured to tape and seal a top sheet to the bin and a bin liner bag creating a complete seal.

The method of any preceding clause, further comprising an apparatus to apply the fitted lid to the bin, wherein the bin is an airtight bin, and wherein the sealing includes tape sealing or heat sealing the fitted lid to the airtight bin.

The method of any preceding clause, further comprising cooling the weight supporting bin and, immediately after cooling the weight supporting bin, applying a modified atmosphere, treatment, and/or substance.

The method of any preceding clause, further comprising an apparatus with one or more nozzles capable to add vacuum-controlled venting, industrial gas, sanitizer, or other functional substances to the headspace and/or enclosed product and then reseal the bin liner.

The method of any preceding clause, further comprising inserting the one or more nozzles into the opening of the bin liner bag and injecting a vacuum, industrial gas, sanitizer, or other functional substances into the bin contents just prior to or in the process of resealing the liner.

The method of any preceding clause, further comprising providing one or more containment devices, pads, or sealing sleeves to prevent leakage during injecting or resealing.

The method of any preceding clause, wherein the one or more nozzles are inserted into the opening of the bin liner bag and vacuum-controlled venting, industrial gas, sanitizer, or other functional substances are injected, sprayed, or inserted into the bin headspace, products, or contents just prior or in the process of sealing the liner-bin enclosure.

The method of any preceding clause, further comprising an apparatus to heat seal the fitted lid to a molded semi-rigid liner sleeve within the bin or the bin.

The method of any preceding clause, further comprising an apparatus which is a vented bin cover that covers the bin in a way to allow maximum rate of cooling within a vacuum cooling tube but also prevents foreign material from falling into the bin space.

The method of any preceding clause, wherein the bin is nestable, stackable, collapsible, foldable, compressible, or any combination thereof.

The method of any preceding clause, wherein the bin does not receive a liner.

The method of any preceding clause, wherein the bin receives a liner, and wherein the bin, the lid, the liner, or any combination thereof is nestable, stackable, collapsible, foldable, compressible, or any combination thereof.

According to an aspect of the present disclosure, a system for sealing a bin includes a movable conveyor for moving one or more bins; a protective racking system for stacking one or more bins into the movable shuttle or conveyor; and a vacuum cooling tube, wherein the one or more bins have an open top or vented bin lid, the open top or vented bin lid configured to cool a product within the bin and protect the product from falling debris and cross contamination during vacuum cooling, gas flushing, substance treatments, further handling, the covering, closing, and/or sealing of the bins.

The system of the preceding clause, further including a sealer for sealing a liner within the bin.

Although the foregoing description is directed to the preferred embodiments, it is noted that other variations and modifications will be apparent to those skilled in the art and may be made without departing from the spirit or scope of the disclosure Moreover, features described in connection with one embodiment may be used in conjunction with other embodiments, even if not explicitly stated above.

The invention claimed is:

1. A method for sealing one or more containers comprising:
   placing the one or more containers having a liner therein on a moving conveyor;
   moving the one or more containers with the conveyor;
   opening the liner;
   collecting the liner with clips, a grab and pinch device, robotic arms, robotic fingers, or combinations thereof, wherein the collecting occurs in tandem with the one or more containers moving along the conveyor;
   pulling together open edges of the liner;
   sealing the liner together with a heated band sealer, a wide or double seal impulse sealer, a heat sealer, a sealer, or combinations thereof, wherein the sealing occurs in tandem with the one or more containers moving along the conveyor;
   providing nitrogen and/or other gasses to an interior of the liner creating a modified atmosphere within the interior of the liner, in conjunction with or after the sealing of the liner; and
   adding one or more functional substances along with the modified atmosphere into the interior of the liner after the sealing of the liner,
   wherein the one or more containers contain perishable product.

2. The method of claim 1, wherein the one or more containers is a bin or a large bulk product packaging container.

3. The method of claim 1, wherein the liner is a bag liner.

4. The method of claim 1, wherein the liner forms a sealed enclosure therein.

5. The method of claim 1, wherein the one or more containers is cooled prior to sealing.

6. The method of claim 1, further comprising cooling the one or more containers and providing nitrogen prior to sealing, and wherein the one or more functional substances comprises a sanitizer and/or substance treatment that is added to the interior of the liner of each of the one or more containers during or at the end of the cooling.

7. The method of claim 6, wherein the cooling is vacuum cooling.

8. The method of claim 1 further comprising:
   piercing the liner with one or more nozzles, to (i) provide the nitrogen and/or other gasses to the interior of the liner creating the modified atmosphere, and/or (ii) add the one or more functional substances along with the modified atmosphere into the interior of the liner prior to removing the one or more nozzles from the liner;
   removing the one or more nozzles from the liner; and
   sealing a location where the one or more nozzles pierced the liner.

9. The method of claim 1, further comprising resealing the liner, in conjunction with or immediately after the modified atmosphere is created.

10. A method for sealing a perishable product in a bin comprising:
    placing the bin having a liner therein on a moving conveyor;
    moving the bin with the conveyor;
    opening the liner;
    collecting the liner with clips, a capture-grab and pinch device, robotic arms, robotic fingers, or combinations thereof, wherein the collecting occurs in tandem with the bin moving along the conveyor;
    pulling together open edges of the liner and twisting and looping the edges of the liner together;
    sealing the twisted and looped edges of the liner together with a taper, zip tie device, heat seal, or combinations thereof, at the twisted and looped location;
    providing nitrogen and/or other gasses to an interior of the liner creating a modified atmosphere within the interior of the liner, in conjunction with or after the sealing of the twisted and looped edges of the liner; and
    adding one or more functional substances along with the modified atmosphere into the interior of the liner after the sealing of the twisted and looped edges of the liner.

11. A method for sealing a perishable product in a bin comprising:
    molding a bin liner to form a molded bin liner, wherein the molded bin liner is a semi-rigid sleeve;
    placing the molded bin liner in the bin, wherein the bin is a weight supporting bin;
    fitting a lid over the molded bin liner and the bin, wherein the lid clicks and seals to the molded bin liner;
    cooling the bin, wherein the fitting of the lid over the molded bin liner and the bin is prior to the cooling, and the lid includes perforations that are open prior to the cooling; and
    closing the perforations after cooling and infusion of an interior of the bin with nitrogen, industrial gas, and/or a functional substance treatment.

12. The method of claim 11, further comprising heat sealing the lid to the molded bin liner.

13. The method of claim 11, wherein the lid further comprises a top sheet, a vented lid cap, or a lid cap.

14. The method of claim 11, wherein closing the perforations includes taping the perforations, moving a lid cover over the perforations to seal the perforations, sealing the perforations, replacing the lid with a non-vented lid, or combinations thereof.

15. A method for sealing a perishable product comprising:
    providing a weight supporting bin containing the perishable product;
    sealing the weight supporting bin with a fitted lid;
    providing nitrogen and/or other gasses to the bin creating a modified atmosphere within the weight supporting bin after sealing the weight supporting bin;
    adding other functional substances along with the modified atmosphere into the sealed weight supporting bin; and
    resealing the weight supporting bin, in conjunction with or immediately after the modified atmosphere is created.

16. The method of claim 15, further comprising cooling the weight supporting bin.

17. The method of claim 16, further comprising applying a top sheet to the bin, wherein the fitted lid is applied to the weight supporting bin prior to the cooling and wherein the top sheet has perforations that are open prior to cooling and are then tape sealed closed after cooling and infusion with a substance treatment.

18. The method of claim 15, further comprising an apparatus for de-cuffing a plastic bin liner bag from a bin and elevate the bin liner bag up vertically, straighten and stretch it taut.

19. The method of claim 18, further comprising an apparatus designed to capture the elevated bin liner bag and hold in place while the bin is moving along a conveyor between stages.

20. The method of claim 15, further comprising an apparatus de-cuffing, elevating, straightening and stretching or holding a liner bag that may include one or more nozzle-fingers for vacuuming or adding industrial gas or applying substance treatments inside of the liner bag during conveyance, prior to, and/or in conjunction with the sealing.

21. The method of claim 15, wherein the sealing further comprises an apparatus for band heat sealing or impulse heat sealing a liner to complete the seal.

22. The method of claim 15, further comprising an apparatus configured to apply a top sheet over the bin and a pulled open bin liner bag within the bin.

23. The method of claim 15, wherein the sealing further comprises an apparatus configured to tape and seal a top sheet to the bin and a bin liner bag creating a complete seal.

24. The method of claim 15, further comprising an apparatus to apply the fitted lid to the bin, wherein the bin is an airtight bin, and wherein the sealing includes tape sealing or heat sealing the fitted lid to the airtight bin.

25. The method of claim 24, further comprising cooling the weight supporting bin and, immediately after cooling the weight supporting bin, applying a modified atmosphere, treatment, and/or substance.

26. The method of claim 15, further comprising an apparatus with one or more nozzles capable to add vacuum-controlled venting, industrial gas, sanitizer, or other functional substances to a headspace and/or enclosed product and then reseal a bin liner.

27. The method of claim 26, further comprising inserting the one or more nozzles into an opening of the bin liner and injecting a vacuum, industrial gas, sanitizer, or other functional substances into bin contents just prior to or in a process of resealing the liner.

28. The method of claim 27, further comprising providing one or more containment devices, pads, or sealing sleeves to prevent leakage during injecting or resealing.

29. The method of claim 26, wherein the one or more nozzles are inserted into an opening of the bin liner and vacuum-controlled venting, industrial gas, sanitizer, or other functional substances are injected, sprayed, or inserted into the headspace, products, or contents just prior or in a process of sealing the liner.

30. The method of claim 15, further comprising an apparatus to heat seal the fitted lid to a molded semi-rigid liner sleeve within the bin or the bin.

31. The method of claim 15, further comprising an apparatus which is a vented bin cover that covers the bin in a way to allow maximum rate of cooling within a vacuum cooling tube but also prevents foreign material from falling into the bin.

32. The method of claim 15, wherein the bin is nestable, stackable, collapsible, foldable, compressible, or any combination thereof.

33. The method of claim 15, wherein the bin does not receive a liner.

34. The method of claim 15, wherein the bin receives a liner, and wherein the bin, the lid, the liner, or any combination thereof is nestable, stackable, collapsible, foldable, compressible, or any combination thereof.

35. A method for sealing a perishable product in a bin comprising:
    molding a bin liner to form a molded bin liner, wherein the molded bin liner is a semi-rigid sleeve;
    placing the molded bin liner in the bin, wherein the bin is a weight supporting bin;
    fitting a lid over the molded bin liner and the bin, wherein the lid clicks and seals to the molded bin liner; and
    cooling the bin,
    wherein the fitting of the lid over the molded bin liner and the bin is prior to the cooling, and
    wherein (i) the lid includes perforations that are open prior to cooling and are then tape sealed closed, (ii) the lid comprises a vented lid-cap that is open prior to cooling and is then tape sealed closed, (iii) a cover is applied only to a vented portion of the lid, or (iv) the lid is replaced with a non-vented lid which is sealed after cooling and infusion with nitrogen.

* * * * *